United States Patent
Tallapaneni

(10) Patent No.: US 9,852,274 B2
(45) Date of Patent: Dec. 26, 2017

(54) MEDIA CLIENT DEVICE SETUP UTILIZING ZERO-TOUCH INSTALLATION

(71) Applicant: Verizon Patent and Licensing Inc., Arlington, VA (US)

(72) Inventor: Kishore Tallapaneni, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 334 days.

(21) Appl. No.: 14/689,522

(22) Filed: Apr. 17, 2015

(65) Prior Publication Data

US 2016/0306949 A1 Oct. 20, 2016

(51) Int. Cl.
| | |
|---|---|
| *H04L 29/06* | (2006.01) |
| *G06F 21/10* | (2013.01) |
| *H04W 12/04* | (2009.01) |
| *H04W 12/08* | (2009.01) |
| *H04W 4/00* | (2009.01) |
| *H04W 12/06* | (2009.01) |
| *H04W 84/12* | (2009.01) |

(52) U.S. Cl.
CPC ............ *G06F 21/10* (2013.01); *H04L 63/061* (2013.01); *H04L 63/0876* (2013.01); *H04L 65/4069* (2013.01); *H04W 4/001* (2013.01); *H04W 12/04* (2013.01); *H04W 12/08* (2013.01); *H04W 12/06* (2013.01); *H04W 84/12* (2013.01)

(58) Field of Classification Search
CPC ... H04W 12/00; H04W 12/04; H04W 12/006; H04W 12/08; H04L 63/0876; H04L 63/10
See application file for complete search history.

(56) References Cited

U.S. PATENT DOCUMENTS

| | | | |
|---|---|---|---|
| 2008/0160914 A1* | 7/2008 | McRae | H04W 12/04 455/41.2 |
| 2010/0016683 A1* | 1/2010 | Lemmers | G06F 19/3418 600/301 |

* cited by examiner

*Primary Examiner* — Edward Zee

(57) ABSTRACT

A device may receive and store first device information (first information), associated with a media client device (media client), and a first security key (a first key) from a content provider network (CPN); and may receive a provisioning request from the media client, including second device information (second information), based on the media client detecting an absence of a physical network connection to receive media content. The device may compare the first information and the second information and may request a second security key (a second key) based on the first information matching the second information. The device may receive the second key from the media client and may compare the first key and the second key. The device may enable the media client to establish a secure connection to the CPN, via a network associated with the device, based on the first key matching the second key.

20 Claims, 15 Drawing Sheets

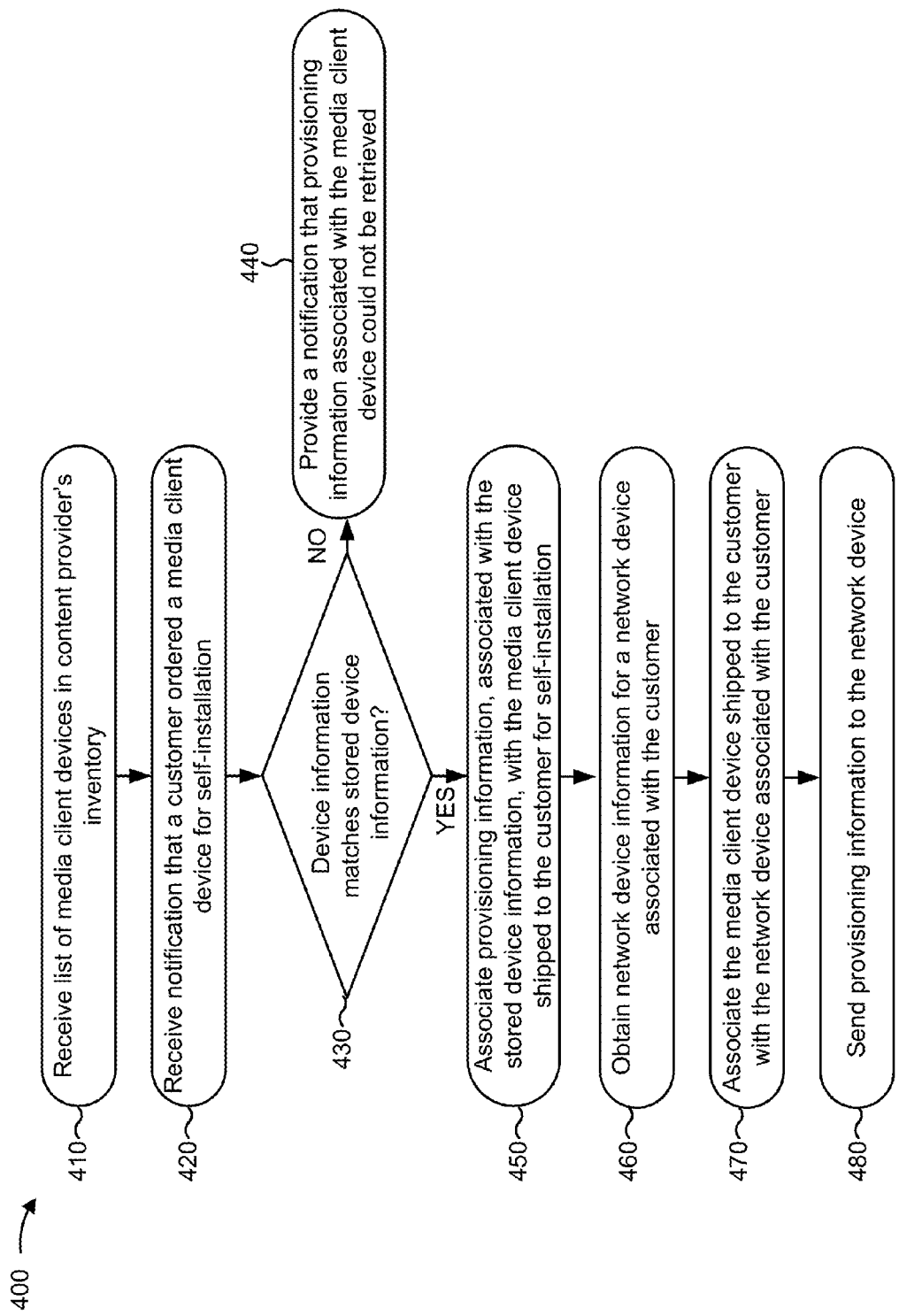

MEDIA CLIENT DEVICE SETUP UTILIZING ZERO-TOUCH INSTALLATION

BACKGROUND

A media client device (e.g., a set-top box) may provide media content to a user. For example, a set-top box may be used to present a television program or on-demand content to the user. The set-top box may receive a source signal, including the media content, via a wired or a wireless connection. For a wireless signal to be used, the set-top box may connect to a wireless fidelity (Wi-Fi) network using Wi-Fi Protected Setup (WPS) or selecting a service set identifier (SSID) for the Wi-Fi network.

BRIEF DESCRIPTION OF THE DRAWINGS

FIG. 4 is a flow chart of an example process for deploying provisioning information to a network device to enable setup for a media client device utilizing zero-touch installation;

DETAILED DESCRIPTION OF PREFERRED EMBODIMENTS

The following detailed description of example implementations refers to the accompanying drawings. The same reference numbers in different drawings may identify the same or similar elements.

When a wireless media client device (e.g., a set-top box) is set up or installed at a location (e.g., a home) the wireless set-top box may connect to a wireless network provided by a network device (e.g., a router) using a network identifier and a network passcode. For example, a technician that is setting up the wireless set-top box may use a remote control and a user interface provided by the set-top box to manually enter a network identifier and a network passcode so that the set-top box may connect to the network device. Manually entering the network identifier and the network passcode via the set-top box interface may be a time consuming and error prone process. Moreover, the technician may have multiple wireless set-top boxes to set up at the location.

Accordingly, the technician may manually input the network identifier and the network passcode into each of the set-top boxes, thereby using valuable time and reducing the number of appointments the technician may be able to service. A user of the set-top box, attempting a self-installation of the set-top box, may encounter the same installation issues as the technician. The user's installation issues may be exacerbated as the user may be less familiar than the technician with installing set-top boxes.

Implementations described herein may allow for a simple and rapid installation of a media client device via an automatic installation process (e.g., a "zero-touch" installation) without having to manually input network information (e.g., a network identifier, a network passcode, etc.) for a network device into the media client device. The network device may automatically receive provisioning information for the media client device associated with the network device. The media client device may automatically initiate the zero-touch installation by detecting an absence of a physical network connection to receive media content from a content provider network. The media client device may complete the zero-touch installation by automatically establishing a secure and wireless connection to the content provider network, via the network device, based on using the previously stored provisioning information.

Figure 1A:
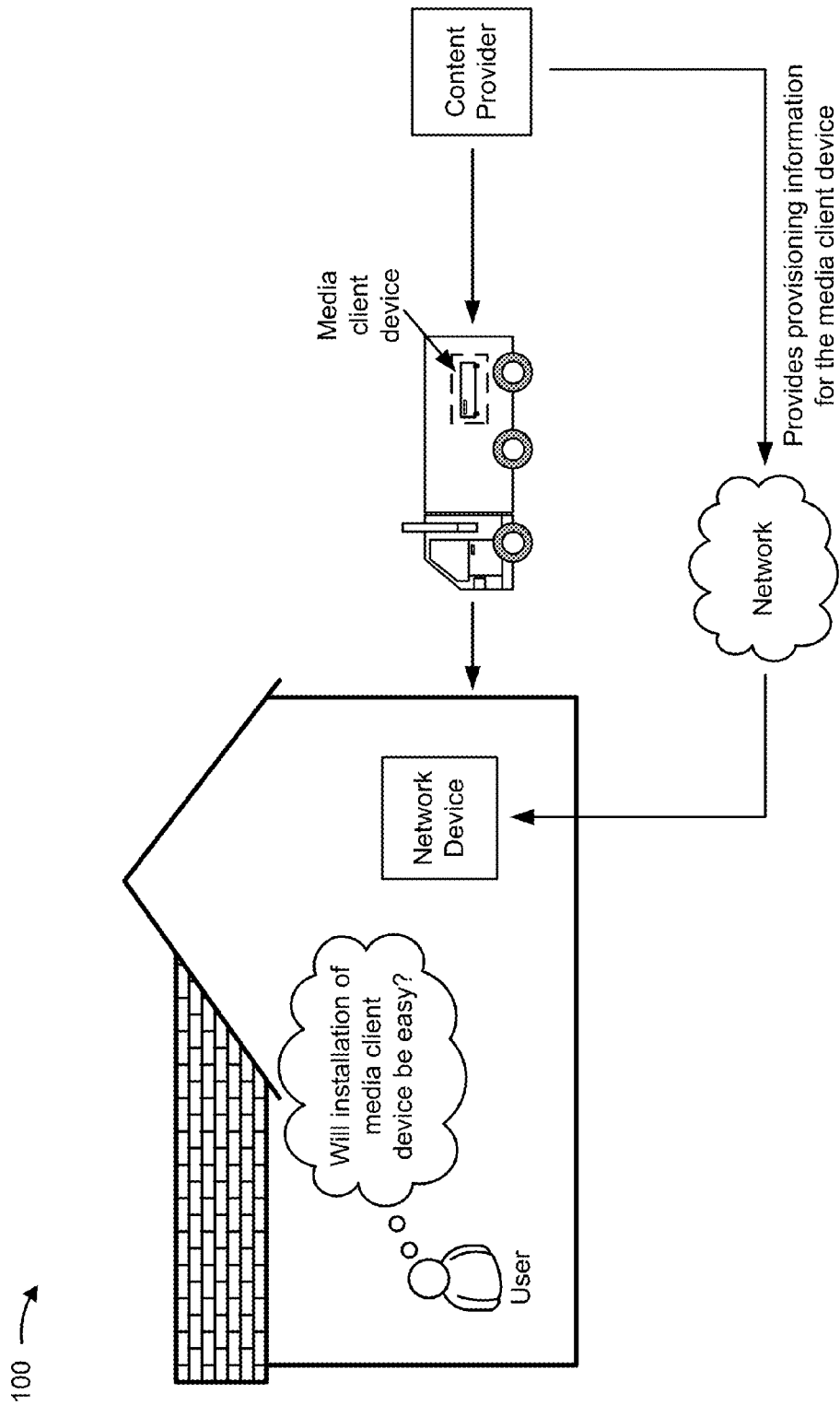
FIG. 1A-1B is a diagram of an overview of an example implementation described herein.
Figure 1B:
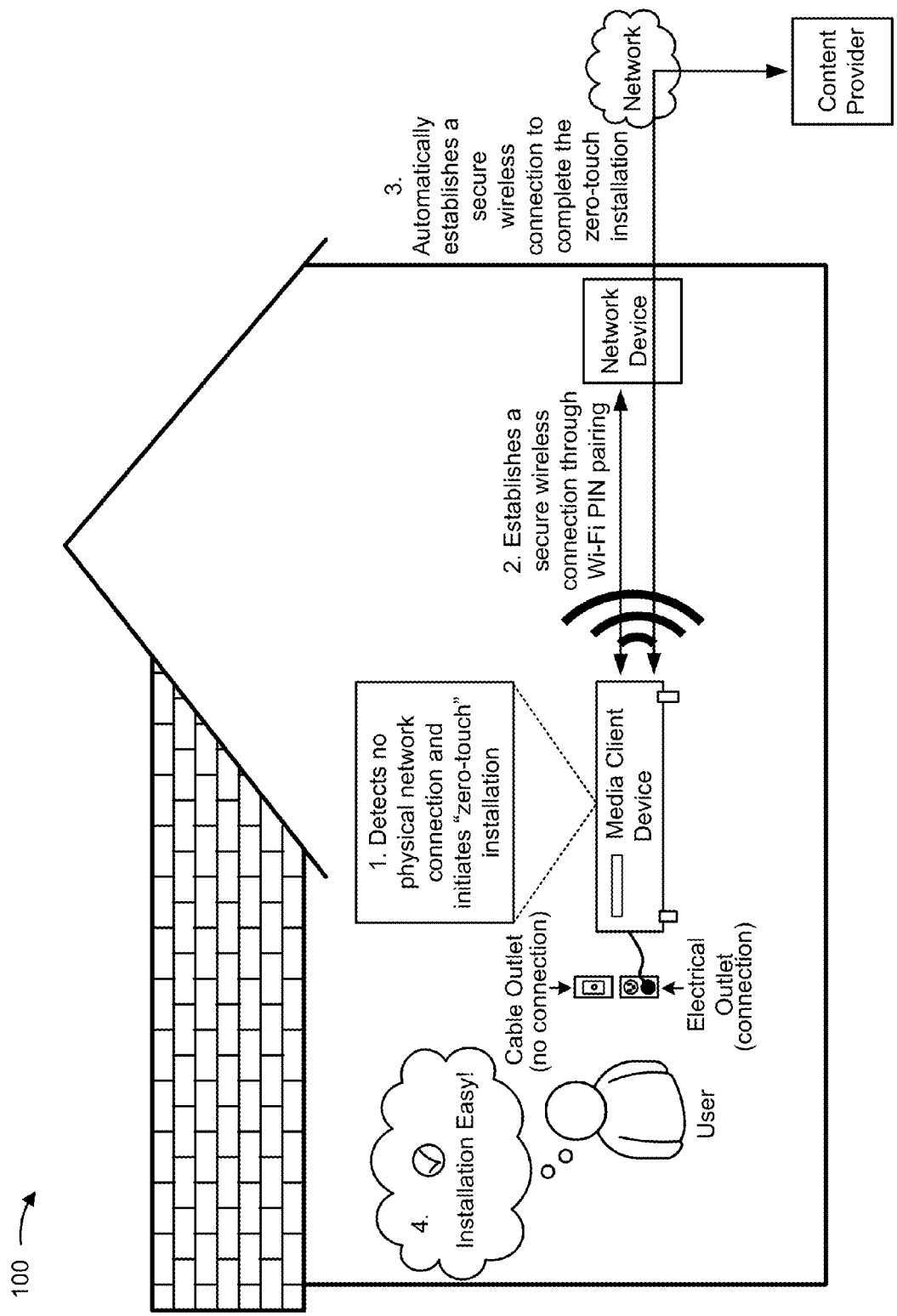

FIGS. 1A-1B are diagrams of an overview of an example implementation 100 described herein. In FIG. 1A, assume a user has placed an order for a media client device (e.g., a set-top box) with a content provider, and is waiting for delivery of the media client device at a location (e.g., a house). Assume while waiting, the user questions whether installation of the media client device will be easy. Further assume the user has a network device (e.g., a broadband home router or BHR), previously provided by the content provider that provides a wireless local area network (WLAN) (e.g., a Wi-Fi network) and a connection to a server associated with the content provider.

As shown in FIG. 1A, the content provider provides provisioning information (e.g., device information, including a device identifier, such as a serial number, and a network identifier, such as a Media Access Control (MAC) address, for the media client device shipped to the user and a security key such as a personal identification number (PIN) for Wi-Fi pairing) to the network device, via a network.

In FIG. 1B, assume the user received the media client device from the content provider. Assume the network device and the media client device are capable of communicating wirelessly (e.g., utilizing an IEEE 802.11ac wireless networking standard). Assume the user provides power to the media client device (e.g., by plugging in the media client device and turning the media client device 'ON'). As shown in FIG. 1B, and by reference number 1, the media client device may detect an absence of a physical network connection (e.g., a coaxial cable), allowing the media client device to connect to the server associated with the content provider, and may initiate a zero-touch installation.

As shown in FIG. 1B, and by reference number 2, the network device and the media client device may establish a secure wireless connection (e.g., via a Wi-Fi PIN pairing process), using the provisioning information provided by the content provider to the network device. As shown in FIG. 1B, and by reference number 3, the media client device may automatically establish a secure wireless connection to the content provider, via the network device, to complete the zero-touch installation. Media client device may receive media content from the content provider after completing the zero-touch installation.

As shown in FIG. 1B, and by reference number 4, the user, having simply to provide power and turn on the media client device, finds the zero-touch installation easy. In this way, the media client device may connect to the network device without the user having to manually configure the media client device.

Figure 2:
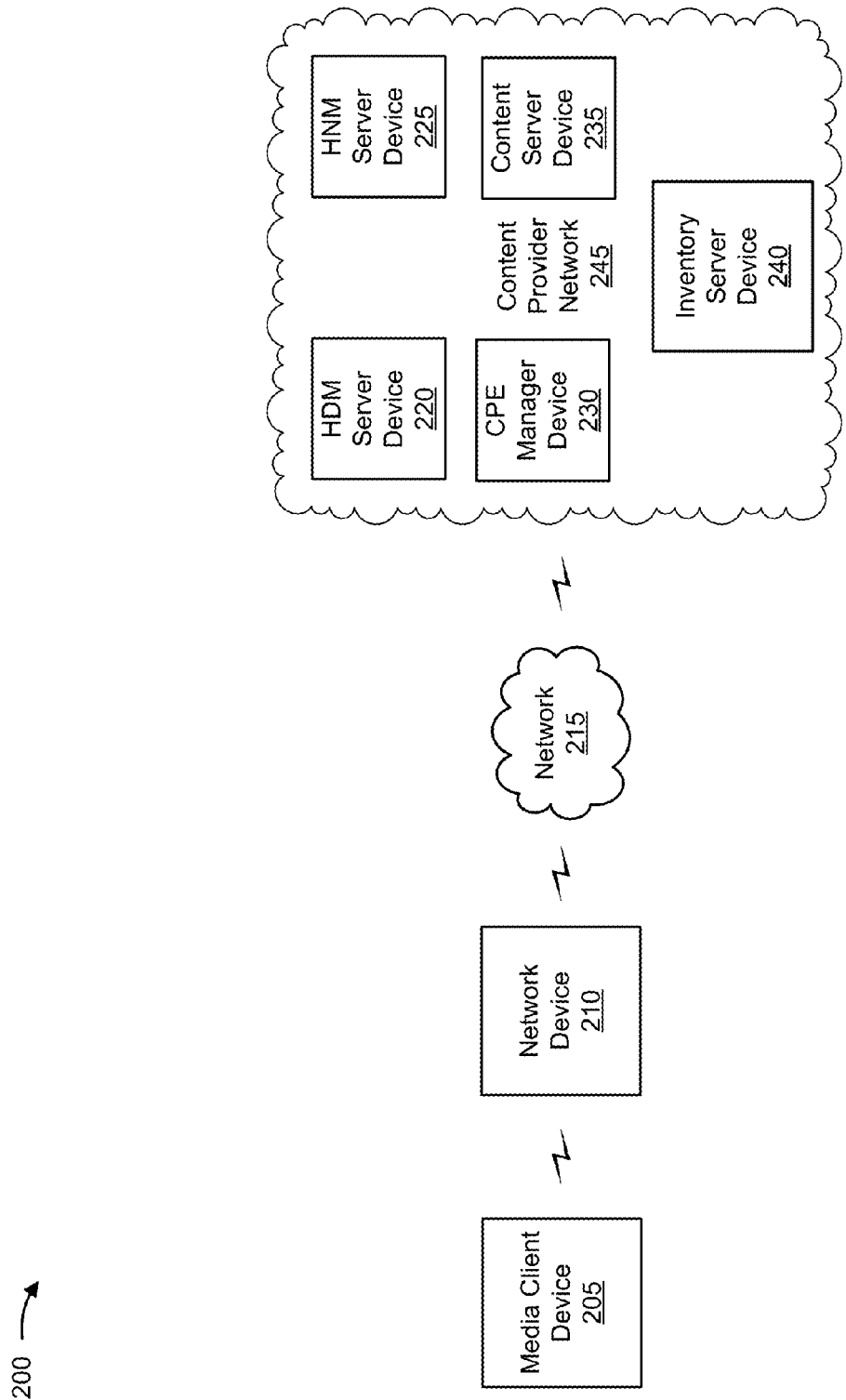
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a media client device 205, a network device 210, a network 215, a home device management (HDM) server device 220, a home network management (HNM) server device 225, a consumer premise equipment (CPE) manager device 230, a content server device 235, an inventory server device 240, and/or a content provider network 245. Devices of environment 200 may interconnect via wired connections, wireless connections, or a combination of wired and wireless connections.

Media client device 205 may include a device capable of receiving, transmitting, and/or processing multimedia content and providing the multimedia content to a user (e.g., via a television or another type of display device). Examples of media client device 205 may include a set-top box, a casting stick (e.g., a high-definition media interface (HDMI) dongle), a computer, a cable card, a gaming device, a portable electronic device, and/or another type of device capable of receiving, transmitting, and/or processing multimedia content and providing the multimedia content to a user.

In some implementations, media client device 205 may include wireless communication technology (e.g., utilizing an IEEE 802.11ac wireless networking standard). In some implementations, media client device 205 may include device information (e.g., a device identifier and a network identifier, such as a MACID) and a security key such as a personal identification number (PIN), stored in a memory, to establish a secure connection with network device 210 and/or another device, based on utilizing a security mechanism (e.g., Wi-Fi PIN pairing).

Network device 210 may include one or more devices (e.g., one or more traffic transfer devices) capable of processing and/or transferring data. For example, network device 210 may include a router, a modem, a gateway, an access point, a firewall, a switch, a hub, a bridge, a reverse proxy, a server (e.g., a proxy server), a security device, an intrusion detection device, a load balancer, and/or a similar device. In some implementations, network device 210 may include a wireless router that wirelessly communicates with media client device 205 and transfers data between media client device 205 and network 215.

In some implementations, network device 210 may include wireless communication technology (e.g., utilizing an IEEE 802.11ac wireless networking standard). In some implementations, network device 210 may include device information (e.g., a device identifier and a network identifier, such as a MACID) and a security key such as a PIN, provided by HNM server device 225 (via HDM server device 220), stored in memory to establish a secure connection with media client device 205 and/or another device, based on utilizing a security mechanism (e.g., Wi-Fi PIN pairing).

Network 215 may include one or more wired and/or wireless networks. For example, network 215 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a television network, or the like, and/or a combination of these or other types of networks.

HDM server device 220 may include one or more server devices capable of storing, processing, and/or routing information. In some implementations, HDM server device 220 may include a communication interface that allows HDM server device 220 to receive information from and/or transmit information to HNM server device 225, CPE manager device 230, content server device 235, inventory server device 240, and/or other devices in environment 200. HDM server device 220 may receive, store, process, and/or route provisioning information from HNM server device 225 to network device 210.

HNM server device 225 may include one or more server devices capable of storing, processing, and/or routing information. In some implementations, HNM server device 225 may include a communication interface that allows HNM server device 225 to receive information from and/or transmit information to HDM server device 220, CPE manager device 230, content server device 235, inventory server device 240, and/or other devices in environment 200. HDM server device 220 may receive provisioning information from inventory server device 240 for a media client device 205 shipped to a user, based on an order by the user for self-installation of media client device 205.

HNM server device 225 may obtain customer account information associated with the user of media client device 205 and/or network device 210. HNM server device 225 may associate media client device 205 and network device 210 based on the customer account information and/or the provisioning information. HNM server device 225 may provide the provisioning information for media client device 205 to associated network device 210.

CPE manager device 230 may include one or more server devices capable of storing, processing, and/or routing information. In some implementations, CPE manager device 230 may include a communication interface that allows CPE manager device 230 to receive information from and/or transmit information to HDM server device 220, HNM server device 225, content server device 235, inventory server device 240, and/or other devices in environment 200. CPE manager device 230 may provide customer shipment information associated with media client device 205 and/or network device 210 to HNM server device 225.

Content server device 235 may include one or more devices capable of storing, processing, and/or routing information. In some implementations, content server device 235 may include a communication interface that allows content server device 235 to receive information from and/or transmit information to HDM server device 220, HNM server device 225, CPE manager device 230, and/or other devices in environment 200. Content server device 235 may provide media content to media client device 205 and/or another device, via network device 210.

Inventory server device 240 may include one or more devices capable of storing, processing, and/or routing information. In some implementations, inventory server device 2240 may include a communication interface that allows inventory server device 240 to receive information from and/or transmit information to HDM server device 220 and/or other devices in environment 200. Inventory server device 240 may provide a list of media client devices 205, including provisioning information for media client devices 205, available in content provider's inventory.

Content provider network 245 may include one or more wired and/or wireless networks. For example, content provider network 245 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a television network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
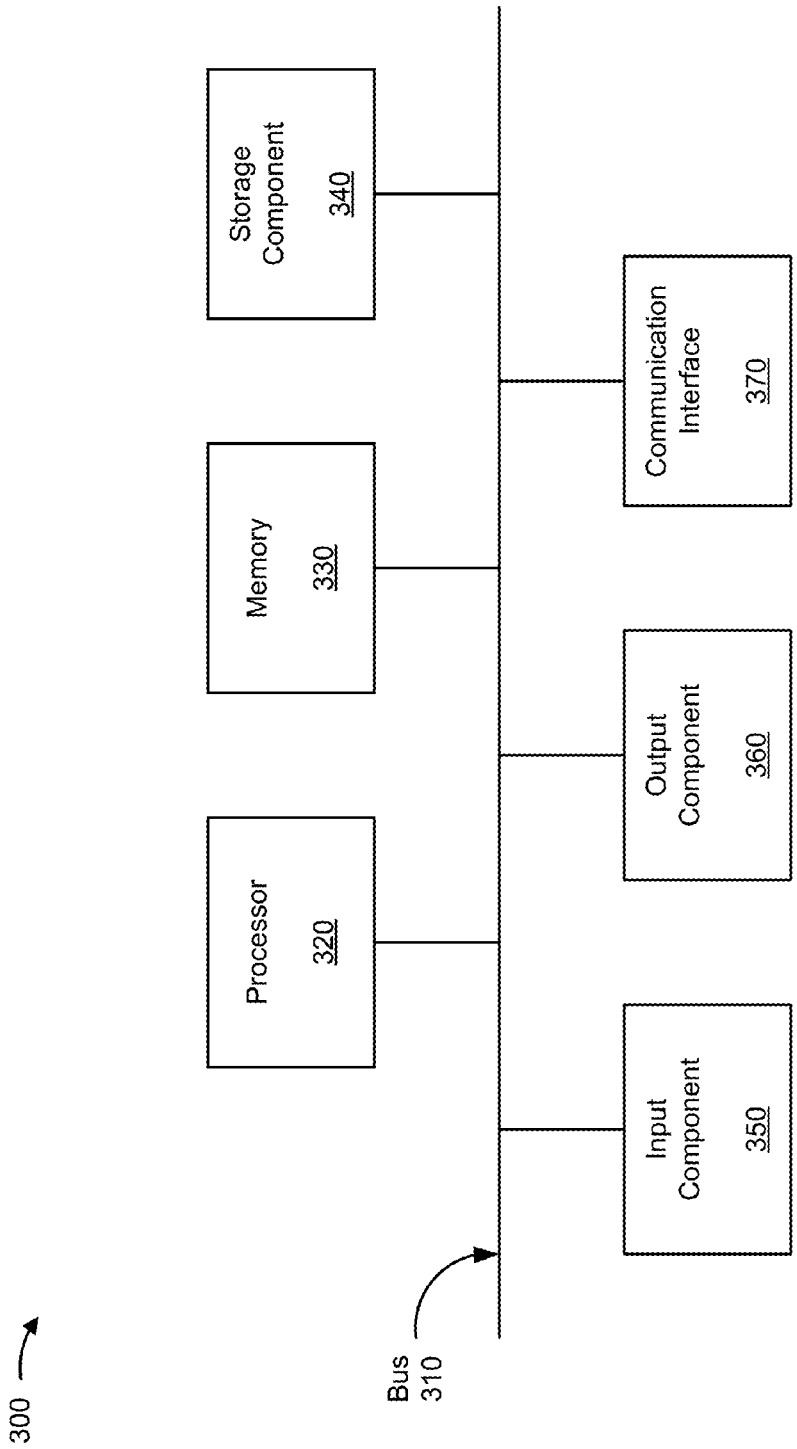
FIG. 3 is a diagram of example components of one or more devices of FIG. 2.

FIG. 3 is a diagram of example components of a device 300. Device 300 may correspond to media client device 205, network device 210, HDM server device 220, HNM server device 225, CPE manager device 230, content server device 235, and/or inventory server device 240. In some implementations, media client device 205, network device 210, HDM server device 220, HNM server device 225, CPE manager device 230, content server device 235, and/or inventory server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for deploying provisioning information to a network device to enable setup for a media client device utilizing zero-touch installation. In some implementations, one or more process blocks of FIG. 4 may be performed by HNM server device 225. In some implementations, one or more process blocks of FIG. 4 may be performed by another device or a set of devices separate from or including HNM server device 225, such as media client device 205, network device 210, HDM server device 220, CPE manager device 230, content server device 235, and/or inventory server device 240.

As shown in FIG. 4, process 400 may include receiving a list of media client devices in content provider's inventory (block 410). For example, HNM server device 225 may receive a list of media client devices 205 in a content provider's inventory from inventory server device 240 and/or another device. The list may include provisioning information for media client devices 205. Provisioning information may include device information (e.g., a device identifier, such as a serial number, and a network identifier, such as a MAC address) for media client devices 205. Provisioning information may also include a security key such as a Personal Identification Number (PIN), associated with each media client device 205 included on the list, for pairing media client devices 205 with an associated network device (e.g., network device 210). The list may include other information related to media client device 205 (e.g., a product name, a model number, a manufacture date, etc.).

Additionally, or alternatively, HNM server device 225 may receive the provisioning information in various formats (e.g., a text file, a rich text file, a binary file, etc.) and in a secure manner (e.g., a secure file transfer protocol (FTPS) transfer, a Secure Shell File Transfer Protocol (SFTP) transfer, file encryption, etc.). In some implementations, a user of HNM server device 225 may facilitate import of the list to HNM server device 225.

Additionally, or alternatively, HNM server device 225 may store the list of media client devices 205, including the provisioning information (i.e., the device information and the associated PIN), in a memory device (e.g., memory 330, storage component 340, etc.) or a collection of memory devices accessible by HNM server device 225. In some implementations, HNM server device 225 may store the list of media client devices 205 in memory device only accessible by a database administrator of HNM server device 225.

As further shown in FIG. 4, process 400 may include receiving a notification that a customer ordered a media client device for self-installation (block 420). For example, HNM server device 225 may receive a notification from CPE manager device 230 of a shipment of media client device 205, ordered by a customer for self-installation. The notification may include device information for media client device 205 shipped to the customer. The notification may also include customer shipment information (e.g., a customer name, a customer account identifier for the customer associated with the content provider, a customer address, customer billing information, etc.).

In some implementations, HNM server device 225 may receive a notification of un-provisioning information. Un-provisioning information may include information related to disassociating a PIN from media client device 205, such as in a case of a security compromise. In some implementations, HNM server device 225 may receive a notification of a change to the provisioning information (e.g., a change due to a replacement media client device 205 shipped to the customer, a change due to a security compromise, a change due to an administrative change to PIN formatting, etc.).

As further shown in FIG. 4, process 400 may include determining whether the device information matches stored device information (block 430). For example, HNM server device 225 may compare the device information for media client device 205, shipped to the customer, with the stored device information, included with the list of media client devices 205 received by HNM server device 225. If the device information matches the stored device information, then the provisioning information associated with media client device 205 may be retrieved. If the device information does not match the stored device information, then the provisioning information associated with media client device 205 may not be retrieved.

As further shown in FIG. 4, if the device information does not match the stored device information (block 430—No), process 400 may include providing a notification that the provisioning information associated with the media client device could not be retrieved (block 440). For example, HNM server device 225 may provide an error message indicating that retrieving the provisioning information associated with media client device 205 was not successful. Additionally, or alternatively, HNM server device 225 may provide the error message for display so that a user of HNM server device 225 may understand why the provisioning information could not be retrieved. In some implementations, HNM server device 225 may send a notification to CPE manager device 230 that the device information provided by CPE manager device 230 may be erroneous.

As further shown in FIG. 4, if the device information matches the stored device information (block 430—Yes), process 400 may include associating provisioning information, associated with the stored device information, with the media client device shipped to the customer for self-installation (block 450). For example, HNM server device 225 may retrieve the provisioning information associated with the stored device information and included with the list of media client devices 205 received by HNM server device 225.

Additionally, or alternatively, HNM server device 225 may associate the provisioning information, associated with the stored device information, with media client device 205 shipped to the customer for self-installation. Additionally, or alternatively, HNM server device 225 may store the association between the provisioning information, associated with the stored device information, and media client device 205 shipped to the customer for self-installation, in a memory device (e.g., memory 330, storage component 340, etc.) or a collection of memory devices accessible by HNM server device 225.

As further shown in FIG. 4, process 400 may include obtaining network device information associated with the customer (block 460). For example, HNM server device 225 may obtain customer account information (e.g., the customer name, the customer account identifier, the customer address, etc.) associated with the customer shipment information.

Additionally, or alternatively, HNM server device 225 may determine an association between the customer account information and the customer shipment information based on matching information between the customer account information and the customer shipment information (e.g., the customer name in the customer account information matches the customer name in the customer shipment information, the customer account identifier in the customer account information matches the customer account identifier in the customer shipment information, the customer address in the customer account information matches the customer address in the customer shipment information, etc.).

The customer account information may include network device information (e.g., a device identifier, such as a serial number, and a network identifier, such as MAC address) for network device 210, associated with the customer. In some implementations, the content provider may have previously provided network device 210 to the customer. In some implementations, network device 210 may be located at the same customer address where media client device 205 is being shipped for self-installation.

As further shown in FIG. 4, process 400 may include associating the media client device shipped to the customer with the network device associated with the customer (block 470). For example, HNM server device 225 may associate media client device 205 shipped to the customer with network device 210 associated with the same customer. Additionally, or alternatively, HNM server device 225 may store the association between media client device 205 and network device 210, in a memory device (e.g., memory 330, storage component 340, etc.) or a collection of memory devices accessible by HNM server device 225.

As further shown in FIG. 4, process 400 may include sending provisioning information to the network device (block 480). For example, HNM server device 225 may send provisioning information, associated with media client device 205, to network device 210 via HDM server device 220. HNM server device 230 may use the network device information for network device 210 to direct sending the provisioning information (e.g., using the network identifier for network device 210 as a destination address). In some implementations, HNM server device 225 may utilize a secure protocol (e.g., Technical Report 069 (TR-069) protocol) to send the provisioning information to network device 210, via HDM server device 220.

Additionally, or alternatively, HNM server device 225 may provide the provisioning information by setting parameter values (e.g., SetParameterValue (serial number, 311KP) where a parameter is the device identifier and the device identifier is associated with a value=311KP; SetParameterValue (network identifier, 00:B8:E8:56:B3:7E) where the parameter is the network identifier and the network identifier is associated with the value 00:B8:E8:56:B3:7E; SetParameterValue (PIN, 0000), where the parameter is the PIN and the PIN is associated with the value 0000, etc.), based on using the secure protocol (e.g., TR-069). Additionally, or alternatively, HNM server device 225 may send the parameter values to network device 210, via HDM server device 220.

Additionally, or alternatively, HNM server device 225 may track media client devices 205 installed. In some implementations, HNM server device 225 may provide un-provisioning information to network device 210, via HDM server device 220 (e.g., disassociating the PIN=0000 from media client device 205, based on receiving a notification from CPE server device 230 of an un-provisioning of the PIN from media client device 205). In some implementations, HNM server device 225 may remove the provisioning between media client device 205 and network device 210 by changing the set parameter values (e.g., SetParameterValue changed from (PIN, 0000) to (PIN, NULL) for network device 210 with a network identifier=00:B8:E8:56:B3:7E) and sending the changed set parameter values to network device 210. Additionally, or alternatively, network device 210 may remove the provisioning information (e.g., the PIN) from memory.

In some implementations, HNM server device 225 may provide changed provisioning information to network device 210, via HDM server device 220 (e.g., changing the PIN=0000 to PIN=1111 for media client device 205, based on receiving a notification from CPE server device 230 of a change in media client device 205 shipped to the customer). In some implementations, HNM server device 225 may change the provisioning between media client device 205 and network device 210 by changing the set parameter values (e.g., SetParameterValue changed from (PIN, 0000) to (PIN, 1111) for network device 210 with a network identifier=00:B8:E8:56:B3:7E) and sending the changed set parameter values to network device 210.

Additionally, or alternatively, HNM server device 225 may send provisioning information to a replacement network device 210 when the customer receives (or replaces) network device 210. In some implementations, media client device 205 may receive an error message that network device 210 (previously paired) has been removed or powered off. Additionally, or alternatively, media client device 205 may display the error message that network device 210 has been removed or powered off on a display so that a user of media client device 205 may understand why media client device 205 did not connect wirelessly to network device 210 to receive the media content.

In some implementations, media client device 205 may display troubleshooting information (e.g., was network device 210 replaced?) on a user interface when the pairing fails, allowing the user to interactively troubleshoot a zero-touch installation failure (e.g., the user of media client device 205 may press 'Yes' to the question, 'was network device 210 replaced,' thereby triggering media client device 205 to restart the zero-touch installation process).

Additionally, or alternatively, HNM server device 225 may update the customer account information with changes and/or updates to the PIN (e.g., when new network device 210 is provided to the customer, when media client device 205 is replaced, etc.).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
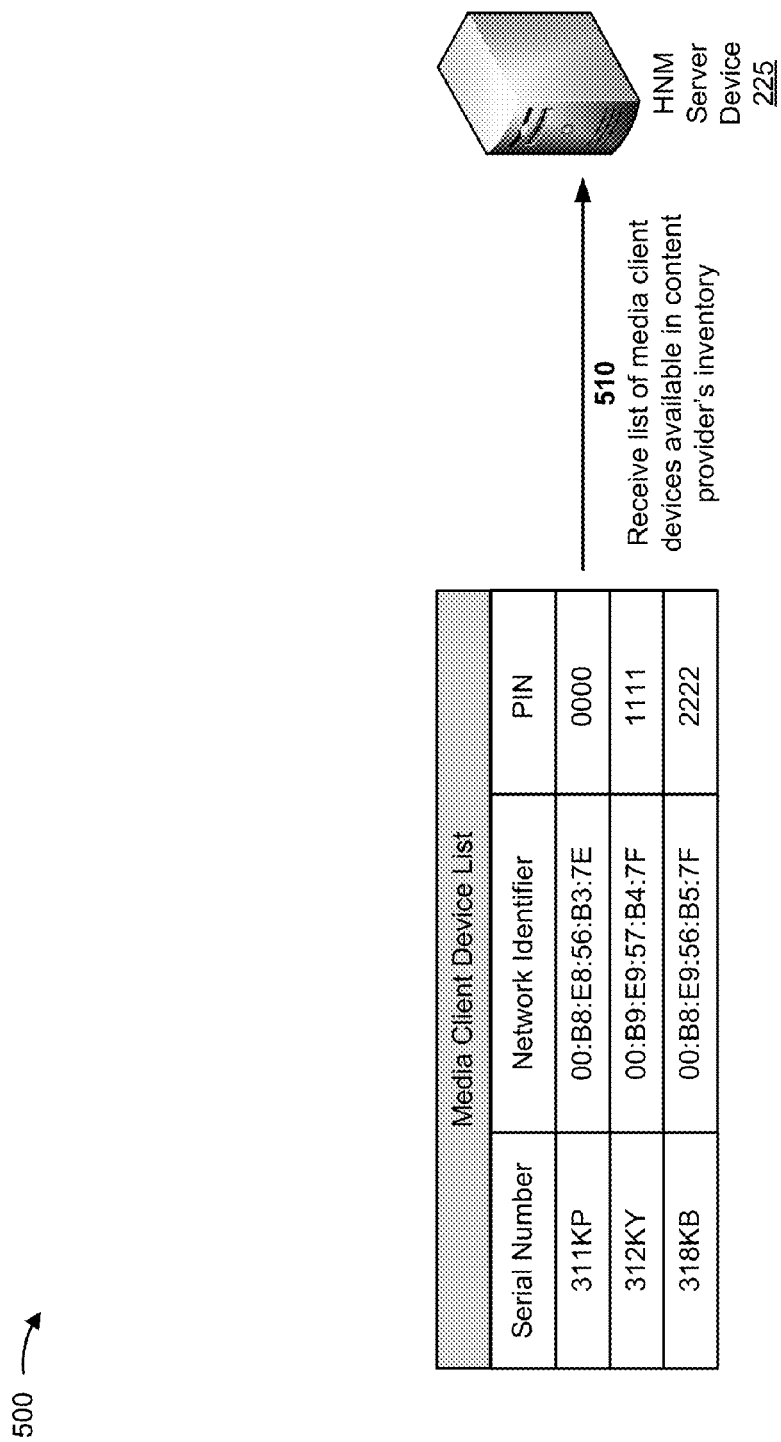
FIGS. 5A-5C are diagrams of an example implementation relating to the example process shown in FIG. 4.
Figure 5B:
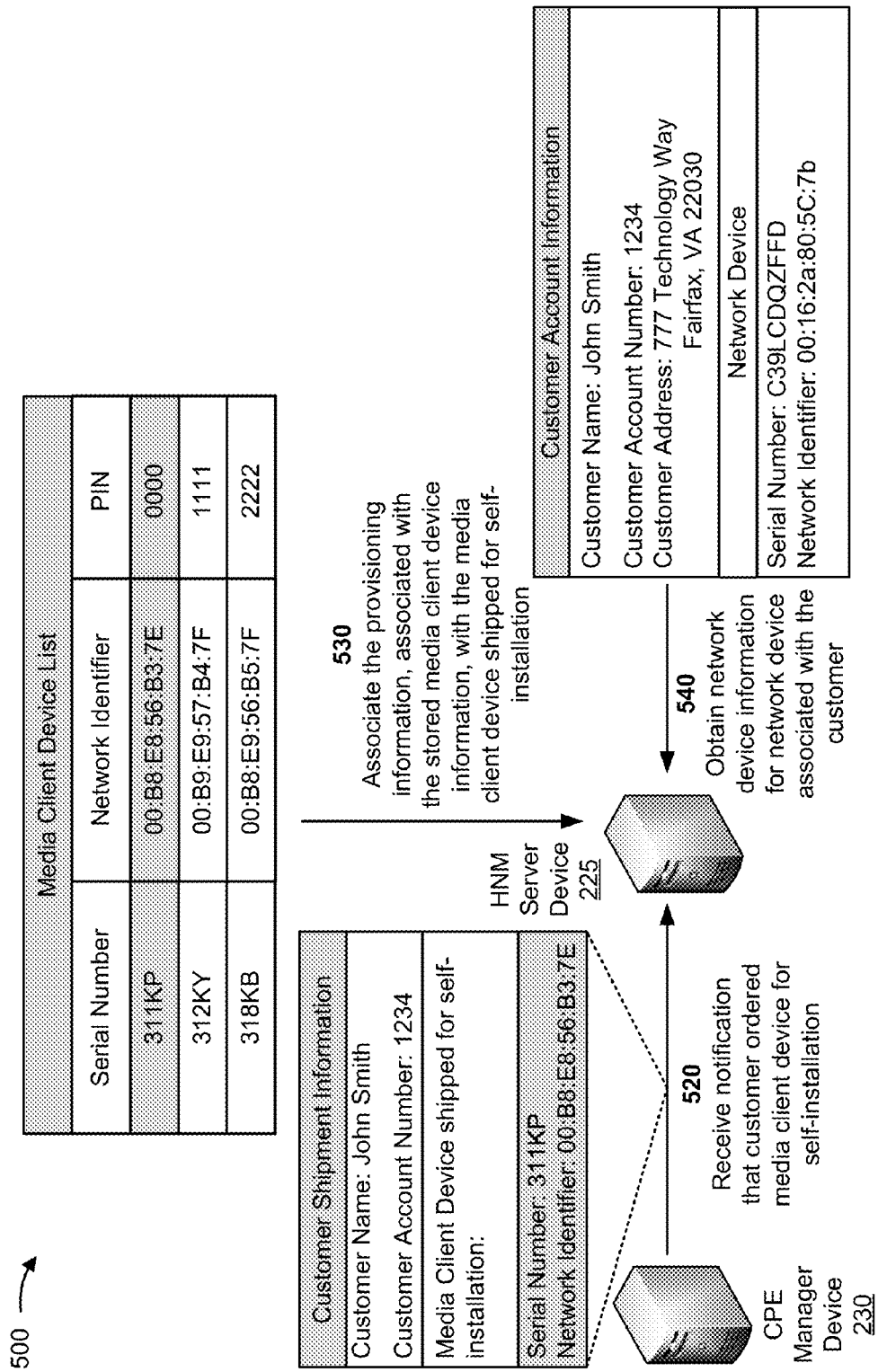
Figure 5C:
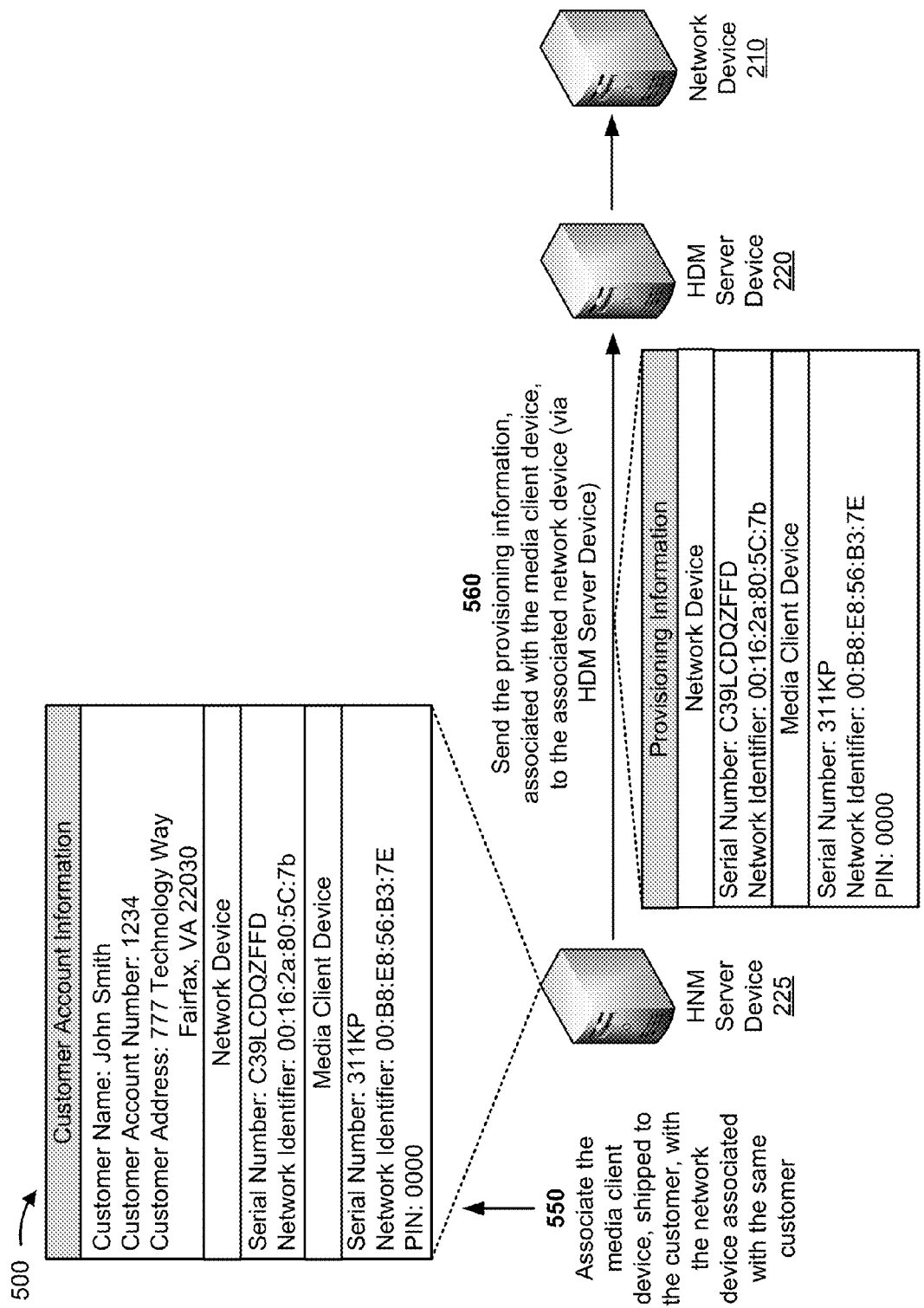

FIGS. 5A-5C are diagrams of an example implementation 500 relating to example process 400 shown in FIG. 4. FIGS. 5A-5C show an example of deploying provisioning information to a network device to enable setup for a media client device utilizing zero-touch installation.

As shown in FIG. 5A, and shown by reference number 510, HNM server device (e.g., HNM server device 225) receives a list of media client devices with provisioning information for media client devices 205. The provisioning information may include device information (e.g., media client device 205 with a device identifier=311KP and a network identifier=00:B8:E8:56:B3:7E, media client device 205 with a device identifier=312KY and a network identifier=00:B9:E9:57:B4:7F, media client device 205 with a device identifier=318KB and a network identifier=00:B8:E9:56:B5:7F, etc.) received from inventory server device 240 for media client devices 205, available in a content provider's inventory.

The provisioning information, provided on the list, may also include personal identification numbers (PINs) associated with media client devices 205 (e.g., a PIN=0000 associated with media client device 205 with the device identifier=311KP and the network identifier=00:B8:E8:56:B3:7E; a PIN=1111 associated with media client device 205 with the device identifier=312KY and the network identifier=00:B9:E9:57:B4:7F; a PIN=2222 associated with media client device 205 with the device identifier=318KB and the network identifier=00:B8:E9:56:B5:7F; etc.) for pairing with a network device (e.g., network devices 210). HNM server device 225 may store the provisioning information, associated with media client devices 205, in a memory device (e.g., memory 330, storage component 340, etc.) or a collection of memory devices accessible by HNM server device 225.

As shown in FIG. 5B, and shown by reference number 520, HNM server device 225 receives a notification from a CPE manager device (e.g., CPE manager device 230) that media client device 205 was shipped to a customer of the content provider for self-installation. As further shown in FIG. 5B, the notification includes the device information for media client device 205 (e.g., media client device 205 with the device identifier=311KP and the network identifier=00:B8:E8:56:B3:7E). The notification may also include customer shipment information for media client device 205 (e.g., a customer name=John Smith; a customer account identifier=1234; a customer address=777 Technology Way, Fairfax Va. 22030; etc.).

As shown in FIG. 5B, HNM server device 225 determines that the device information for media client device 205, received in the notification from CPE manager device 230, matches the stored device information, included with the list of media client devices 205, available in the content provider's inventory and received from inventory server device

240. As shown in FIG. 5B, HNM server device 225, and shown by reference number 530, HNM server device 225 associates the provisioning information, associated with the stored device information, with media client device 205 shipped to the customer for self-installation.

As shown in FIG. 5B, and shown by reference number 540, HNM server device 225 obtains network device information for network device 210 associated with the customer. The network device information may be included in customer account information associated with the customer.

HNM server device 225 obtains the customer account information, associated with the customer, by comparing the information included in the customer shipment information with the information included customer account information and finding matching information (e.g., obtaining customer account information where the customer account identifier=12345 from the customer shipment information matches a customer account identifier=12345 from the customer account information; obtaining customer account information where the customer name=John Smith from the customer shipment information matches a customer name=John Smith from the customer account information; obtaining customer account information where the customer address=777 Technology Way, Fairfax, Va. 22030 from the customer shipment information matches a customer address=777 Technology Way, Fairfax, Va. 22030 from the customer account information; etc.).

HNM server device 225 obtains the network device information for network device 210 included in the obtained customer account information (e.g., obtaining network device information, including a device identifier=C39LCDQZFFD and a network identifier=00:16:2a:80:5c:7b, for customer=John Smith).

As shown in FIG. 5C, and shown by reference number 550, HNM server device 225 associates media client device 205, shipped to the customer, with network device 210 associated with the same customer (e.g., associates media client device 205 with the network identifier=00:B8:E8:56:B3:7E and the PIN=0000 with network device 210 with the device identifier=C39LCDQZFFD and the network identifier=00:16:2a:80:5c:7b). As shown in FIG. 5C, and by reference number 560, HNM server device 225 sends the provisioning information, associated with media client device 205 to network device 210, associated with the same customer, via HDM server device 220.

As indicated above, FIGS. 5A-5C are provided merely as an example. Other examples are possible and may differ from what was described with regard to FIGS. 5A-5C.

Figure 6A:
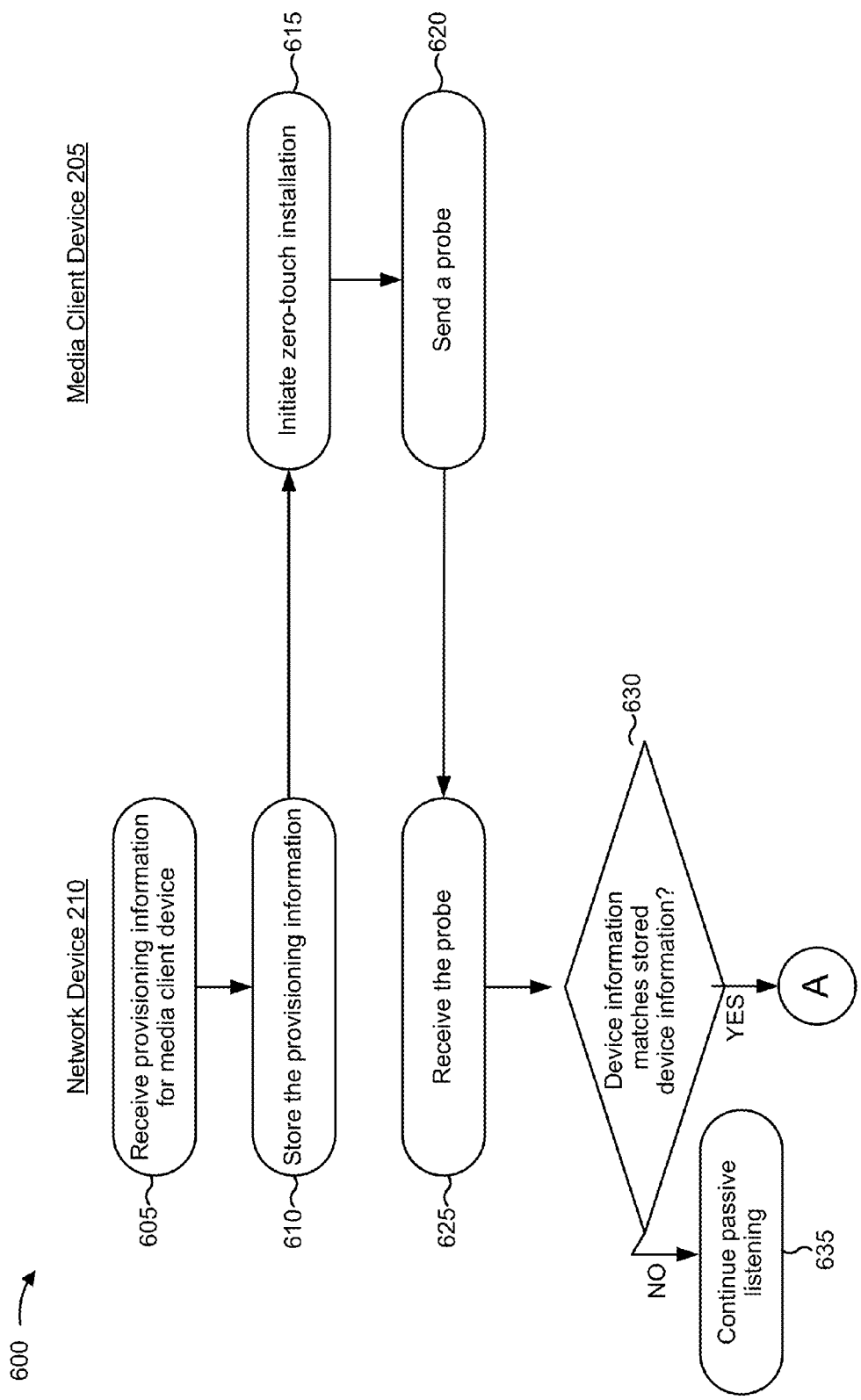
FIG. 6A-6B is a flow chart of an example process for setting up a media client device utilizing zero-touch installation.
Figure 6B:
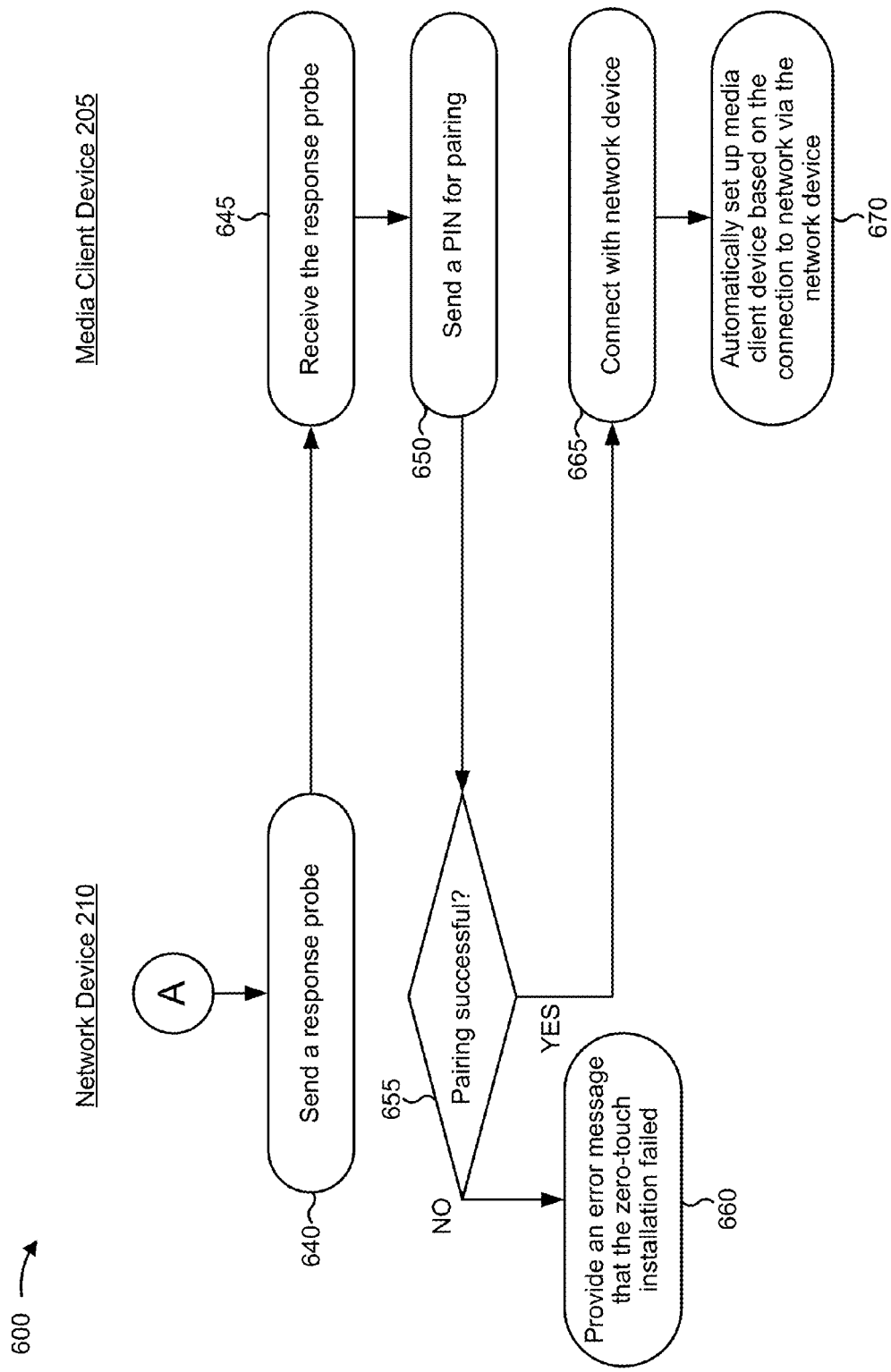

FIGS. 6A-6B are flow charts of an example process 600 for setting up a media client device utilizing zero-touch installation. In some implementations, one or more process blocks of FIGS. 6A-6B may be performed by media client device 205 and/or network device 210. In some implementations, one or more process blocks of FIGS. 6A-6B may be performed by another device or a set of devices separate from or including media client device 205 and/or network device 210, such as HDM server device 220, HNM server device 225, CPE manager device 230, content server device 235, and/or inventory server device 240.

As shown in FIG. 6A, process 600 may include receiving provisioning information for media client device (block 605). For example, network device 210 may receive provisioning information (e.g., device information and a PIN), associated with media client device 205 that was shipped to a customer, for self-installation from HNM server device 225 (via HDM server device 220) for a zero-touch installation using a Wi-Fi pairing process. In some implementations, network device 210 may receive the provisioning information from HNM server device 225, via HDM server device 220, based on a secure session (e.g., utilizing a TR-069 protocol) between network device 210 and HDM server device 220 and between HDM server device 220 and HNM server device 225.

As further shown in FIG. 6A, process 600 may include storing the provisioning information (block 610). For example, network device 210 may store the provisioning information, associated with media client device 205, in a memory device (e.g., memory 330, storage component 340, etc.) or a collection of memory devices accessible by network device 210. In some implementations, network device 210 may store the provisioning information, including the PIN, for an entire lifecycle of network device 210. In some implementations, network device 210 may erase the stored PIN based on information received via the TR-069 protocol, indicating a deep factory reset. In some implementations, network device 210 may change the stored PIN, based on information received via the TR-069 protocol.

As further shown in FIG. 6A, process 600 may include initiating the zero-touch installation (block 615). For example, media client device 205 may receive power (e.g., by a user of media client device 205, who may also be the customer, plugging media client device 205 into an electrical outlet and turning media client device 205 'ON'). Additionally, or alternatively, media client device 205 may detect an absence of a physical network connection (e.g., no signal from an input for a coaxial cable connection).

In some implementations, media client device 205 may provide an error message based on the zero-touch installation failing to initiate (e.g., zero-touch installation may fail if coaxial cable is plugged into the cable outlet, if the zero-touch installation software fails, if media device 205 fails, etc.). In some implementations, media client device 205 may display the error message on a display for media client device 205. In some implementations, media client device 205 may display troubleshooting information on a user interface when the zero-touch installation fails (e.g., detecting a presence of a physical network connection for receiving media content), allowing the user to interactively troubleshoot the zero-touch installation failure.

As further shown in FIG. 6A, process 600 may include sending a probe (block 620). For example, media client device 205 may begin automated provisioning by sending a provisioning request (or probe) to network device 210 and/or another device within a range (e.g., 3 meter, 31 meters, 92 meters, etc.) to communicate with one or more devices, wirelessly, to receive media content. Automated provisioning is an automatic configuring and updating of CPE equipment (e.g., set-top boxes such as media client device 205, modems, multimedia terminal adapters, gateways, etc.). Additionally, or alternatively, media client device 205 may include device information (e.g., a device identifier=311KP and a network identifier=00:B8:E8:56:B3:7E) for media client device 205 and/or other information (e.g., a name for media client device 205, clock information for the media client device 205, frequency information for the media client device 205, etc.) in the probe.

As further shown in FIG. 6A, process 600 may include receiving the probe (block 625). For example, network device 210 may listen for probes from one or more devices, including media client device 205, within a range (e.g., 3 meter, 31 meters, 92 meters, etc.). Additionally, or alternatively, network device 210 may detect the probe sent by media client device 205 and receive the probe for analysis. In some implementations, network device 210 may receive configuration information to decline probes under certain scenarios (e.g., configured to use a "back-off" algorithm for probes originating from a same source where network device 210 may not allow more than a 'n' quantity of probes in a specified 'x' interval, where 'n' and 'x' are fixed variables).

As further shown in FIG. 6A, process 600 may include determining whether the device information matches the stored device information (block 630). For example, network device 210 may compare the device information (e.g., the device identifier=311KP and the network identifier=00:B8:E8:56:B3:7E) included in the probe sent by media client device 205 with the stored device information, included in the provisioning information received from HNM server device 225, via HDM server device 220. If the device information matches the stored device information, then provisioning between network device 210 and media client device 205 is successful. If the device information does not match the stored device information, then provisioning between network device 210 and media client device 205 is not successful.

As further shown in FIG. 6A, if the device information provided by media client device 205 does not match the stored device information (block 630—No), process 600 may include continuing passive listening (block 635). For example, network device 210 may ignore the probe sent by media client device 205 when the device information does not match the stored device information. Additionally, or alternatively, network device 210 may continue listening for probes from one or more media client devices 205 with device information matching the stored device information.

As further shown in FIG. 6A, if the device information matches the stored device information (block 630—Yes), process 600 may include sending a response probe (block 640) (FIG. 6B). For example, network device 210 may send a response probe to media client device 205, indicating to media client device 205 to proceed with provisioning. Additionally, or alternatively, network device 210 may provide network device information (e.g., a network identifier=00:16:2a:80:5C:7b for network device 210, a port identifier for network device 210, a flag, a time stamp when the request probe was sent, etc.) to media client device 205.

As further shown in FIG. 6B, process 600 may include receiving the response probe (block 645). For example, media client device 205 may receive the response probe, from network device 210, to proceed with provisioning (e.g., sending a PIN='0000' for media client device 205 stored in media client device 205).

As further shown in FIG. 6B, process 600 may include sending a PIN for pairing (block 650). For example, media client device 205 may send the PIN (e.g., the PIN=0000), previously stored by media client device 205, to network device 210 in response to the response probe received from network device 210. In some implementations, media client device 205 may have stored the PIN through a burn process in a flash memory device, included in media client device 205, during manufacturing of media client device 205. In some implementations, a user of media client device 205 may use a user interface to input the PIN, stored by the media client device 205. Media client device 205 may include an Application Program Interface (API) to accept the inputted PIN.

As further shown in FIG. 6B, process 600 may include determining whether pairing was successful (block 655). For example, network device 210 may compare the PIN sent from media client device 205 with the PIN, included in the provisioning information received from HNM server device 225, via HDM server device 220. If the PIN sent from media client device 205 matches the PIN, included in the provisioning information stored by network device 210, then pairing between network device 210 and media client device 205 is successful. If the PIN sent from media client device 205 does not match the PIN, included in the provisioning information stored by network device 210, then pairing between network device 210 and media client device 205 is not successful.

In some implementations, media client device 205 may attempt pairing with network device 210 continuously, using the zero-touch installation, within a period of time (e.g., 2 minutes, 3 minutes, 4 minutes, etc.) before determining that the zero-touch installation failed.

As further shown in FIG. 6B, if the pairing was not successful (block 655—No), process 600 may include providing an error message that the zero-touch installation failed (block 660). For example, network device 210 may provide an error message to media client device 205 that a secure connection could not be established based on failure of a Wi-Fi pairing process (e.g., the PIN (e.g., a first security key) did not match the stored PIN (e.g., a second security key)). Additionally, or alternatively, media client device 205 may receive the error message from network device 210 and provide an error message that the pairing failed. In some implementations, media client device 205 may provide an error message that the zero-touch installation failed.

In some implementations, media client device 205 may display the error message that the zero-touch installation and/or the pairing failed on a display so that a user of media client device 205 may understand why media client device 205 did not connect wirelessly to network device 210 to receive the media content. In some implementations, media client device 205 may display the error message after attempting to pair with network device 210 a specified number of times (e.g., after two attempts, after three attempts, after four attempts, etc.). In some implementations, media client device 205 may display troubleshooting information on a user interface when the pairing fails, allowing the user to interactively troubleshoot the zero-touch installation failure.

In some implementations, media client device 205 may initiate a hard Wi-Fi pairing process when the pairing fails. Additionally, or alternatively, a user of network device 210 may press a Wi-Fi Protected Setup (WPS) button on network device 210, initiating Wi-Fi pairing. Additionally, or alternatively, media client device 205 may initiate a hard Wi-Fi pairing by using an API (e.g., VZUAL API), provided on media client device 205. Additionally, or alternatively, media client device 205 may send a probe, including vendor information (e.g., a make and a model) for media client device 205 information, to network device 210 and/or other devices. In some implementations, the vendor information may be encrypted. In some implementations, media client device 205 may create an option under a settings menu to manage the hard Wi-Fi pairing process. Additionally, or alternatively, network device 210 may receive the probe, including the vendor information from media client device 205.

Additionally, or alternatively, network device 210 may compare the vendor information with stored vendor information for media client device 205 intended for pairing. If the vendor information does not match the stored vendor information, network device 210 may provide an error message that the hard Wi-Fi pairing process failed. For example, network device 210 may provide media client device 205 an error message indicating that the hard Wi-Fi pairing process failed. Media client device 205 may receive the error message from network device 210 and provide the error message that the hard Wi-Fi pairing process failed.

In some implementations, media client device 205 may display the error message that the hard Wi-Fi pairing process failed on a display so that a user of media client device 205 may understand why media client device 205 did not connect wirelessly to network device 210 to receive media content. In some implementations, media client device 205 may display the error message after attempting the hard Wi-Fi pairing process with network device 210 a specified number of times (e.g., after two attempts, after three attempts, after four attempts, etc.). In some implementations, media client device 205 may display troubleshooting information on a user interface when the hard Wi-pairing process fails, allowing the user to interactively troubleshoot the zero-touch installation failure.

In some implementations, for added security, network device 210 may compare a vendor extension of network device 210, included in the stored vendor information, with a vendor extension of media client device 205, included in the vendor information (e.g., to verify that a vendor for media client device 205 and network device 210 is Company A).

If the vendor information matches the stored vendor information, network device 210 may create a network identifier (e.g., a service set identifier or SSID) and a passcode (e.g., a Wi-Fi Protected Access Key 2 (WPA2)). Additionally, or alternatively, network device 210 may provide the network identifier and the passcode to media client device 205. In some implementations, network device 210 may provide the network identifier and the passcode to media client device 205 in read-only mode, where the network identifier and the passcode may not be modified by a user of media client device 205 and/or network device 210.

In some implementations, an authorized user of media client device 205 and/or network device 210 (e.g., a database administrator, a technician, etc.) may modify the network identifier and passcode (e.g., by using a Data Model Parameter). Additionally, or alternatively, media client device 205 may access the network associated with network device 210 using the network identifier and the passcode. Additionally, and/or alternatively, media client device 205 may store the network identifier and the passcode for future pairing.

In some implementation, network device 210 may hide the created network identifier and the passcode from broadcast (e.g., the network identifier and the passcode may not be displayed to a user via a display on media client device 205). In some implementations, network device 210 may preserve the network identifier and the passcode through system reboots, backend refreshes, backend initializations, and/or factory resets of network device 210. In some implementations, network device 210 and/or media client device 205 may erase the network identifier and the passcode through a deep factory reset initiated through a TR-069 update.

In some implementations, the user of network device 210 may press the WPS button at any time to initiate a hard Wi-Fi pairing process. In some implementations, media client device 205 may attempt pairing with network device 210 continuously, using the hard Wi-Fi pairing process, within a period of time (e.g., 2 minutes, 3 minutes, 4 window, etc.) before determining that the soft Wi-Fi pairing process failed. In some implementations, a user of network device 210 may press the WPS button after initiation of the hard Wi-Fi pairing process to restart a WPS session timer for a second time period (e.g., adding an additional 2 minutes for pairing, adding an additional 3 minutes for pairing, adding an additional 4 minutes for pairing, etc.).

In some implementations, media client device 205 may initiate a soft Wi-Fi pairing process when the pairing fails. Additionally, or alternatively, media client device 205 may provide a list of alternative methods to enable a pairing mode for network device 210 (e.g., using a video media server (VMS) to enable a pairing mode, using a mobile application on a mobile device to enable a pairing mode, using another application on a user device, such as a technician's table, to enable a pairing mode, etc.) using a data protocol (e.g., TR-069, a Representational State Transfer (REST) API, etc.). Additionally, or alternatively, media client device 205 may display the list on a user interface of media client device 205. Additionally, or alternatively, a user of media client device 205 may select the alternative method, provided on the list, to enable the pairing mode for network device 210.

In some implementations, network device 210 may provide a web service API and/or a TR-069 data model which may be used to trigger the Wi-Fi soft pairing process using the alternative methods (e.g., the VMS, the mobile application, the technician's tablet, etc.). In some implementations, network device 210 may support a Network Address Translation port mapping protocol (e.g., an Internet Gateway Device Protocol) to engage in the soft Wi-Fi pairing process.

Additionally, or alternatively, media client device 205 may send a probe, including the vendor information for media client device 205, to network device 210 and/or other devices, based on media client device 205 initiating the pairing process. In some implementations, the vendor information may be encrypted. In some implementations, media client device 205 may create an option under a settings menu to manage the soft Wi-Fi pairing process.

Network device 210 may receive the probe, including the vendor information from media client device 205. Additionally, or alternatively, network device 210 may compare the vendor information with stored vendor information for media client device 205 intended for pairing. If the vendor information does not match the stored vendor information, network device 210 may provide an error message that the soft Wi-Fi pairing process failed. For example, network device 210 may provide, to media client device 205, an error message indicating that the soft Wi-Fi pairing process failed. Media client device 205 may receive the error message from network device 210 and provide the error message that the soft Wi-Fi pairing process failed.

In some implementations, media client device 205 may display the error message that the soft Wi-Fi pairing process failed on a display so that a user of media client device 205 may understand why media client device 205 did not connect wirelessly to network device 210 to receive media content. In some implementations, media client device 205 may display the error message after attempting the soft Wi-Fi pairing process with network device 210 a specified number of times (e.g., after two attempts, after three attempts, after four attempts, etc.).

In some implementations, media client device 205 may display troubleshooting information on a user interface when the soft Wi-pairing process fails, allowing the user to interactively troubleshoot the zero-touch installation failure. In some implementations, media client device 205 may attempt pairing with network device 210 continuously, using the soft Wi-Fi pairing process, within a period of time (e.g., 2 minutes, 3 minutes, 4 minutes, etc.) before determining that the soft Wi-Fi pairing process failed. In some implementations, media client device 205 may include an API (e.g., VZUAL API) for activating and/or disabling the WPS pairing process.

In some implementations, for added security, network device 210 may compare a vendor extension of network device 210, included in the stored vendor information, with a vendor extension of media client device 205, included in the vendor information (e.g., to verify that a vendor for media client device 205 and network device 210 is Company A).

If the vendor information matches the stored vendor information, network device 210 may create a network identifier (e.g., a service set identifier or SSID) and a passcode (e.g., a Wi-Fi Protected Access Key 2 (WPA2)). Additionally, or alternatively, network device 210 may provide the network identifier and the passcode to media client device 205. In some implementations, network device 210 may provide the network identifier and the passcode to media client device 205 in read-only mode, where the network identifier and the passcode may not be modified by a user of media client device 205 and/or network device 210.

In some implementations, an authorized user of media client device 205 and/or network device 210 (e.g., a database administrator, a technician, etc.) may modify the network identifier and the passcode (e.g., by using a Data Model Parameter). Additionally, or alternatively, media client device 205 may access the network associated with network device 210 using the network identifier and the passcode. Additionally, and/or alternatively, media client device 205 may store the network identifier and the passcode for future pairing.

In some implementation, network device 210 may hide the created network identifier and the passcode from broadcast (e.g., the network identifier and the passcode may not be displayed to a user via a display on media client device 205). In some implementations, network device 210 may preserve the network identifier and the passcode through system reboots, backend refreshes, backend initializations, and/or factory resets of network device 210. In some implementations, network device 210 and/or media client device 205 may erase the network identifier and the passcode through a deep factory reset initiated through a TR-069 update.

If the vendor information matches the stored vendor information, network device 210 may create a network identifier (e.g., a service set identifier or SSID) and a passcode (e.g., a Wi-Fi Protected Access Key 2 (WPA2)). Additionally, or alternatively, network device 210 may provide the network identifier and the passcode to media client device 205. In some implementations, network device 210 may provide the network identifier and passcode to media client device 205 in read-only mode and may not be modified by a user of media client device 205 and/or network device 210.

In some implementations, an authorized user of media client device 205 and/or network device 210 (e.g., a database administrator, a technician, etc.) may modify the network identifier and passcode (e.g., by using a Data Model Parameter). Additionally, or alternatively, media client device 205 may access the network associated with network device 210 using the network identifier and the passcode.

In some implementation, network device 210 may hide the created network identifier from broadcast (e.g., the network identifier and the passcode may not be displayed to a user via a display on media client device 205). In some implementations, network device 210 may preserve the network identifier and the passcode through system reboots, backend refreshes, backend initializations, and/or factory resets of network device 210. In some implementations, network device 210 may erase the network identifier and the passcode through a deep factory reset initiated through a TR-069 update.

As further shown in FIG. 6B, if the pairing was successful (block 655—Yes), process 600 may include connecting with the network device (block 665). For example, network device 210 may authenticate media client device 205 based on the pairing, granting media client device 205 access to a wireless network provided by network device 210, and permit media client device 205 to communicate with network 215 via network device 210.

In some implementations, media client device 205 may receive a notification (e.g., a message) that the pairing was successful. In some implementations, media client device 205 may bond with network device 210. Bonding is a process that occurs after pairing where the exchanged PINs (e.g., the first security key and the second security key) are stored for later use.

As further shown in FIG. 6B, process 600 may include automatically setting up media client device based on the connection to network device (block 670). For example, media client device 205 may automatically set up media client device 205 by communicating with content provider network 245 and/or content server device 235, via network device 210. In some implementations, network device 210 may check a quantity of media client devices 205 paired with network device 210. Additionally, or alternatively, network device 210 may be configured to pair with no more than a maximum quantity of secure connections. For example, network device 210 may be configured to pair with a maximum quantity of media client devices 205 (e.g., may pair with a maximum of 2 media client devices 205; may pair with a maximum of 4 media client devices 205; may pair with a maximum of 7 media client devices 205, etc.).

If network device 210 determines network device 210 reached a maximum quantity of pairings, network device 210 may cancel the Wi-Fi pairing process with media client device 205. Additionally, or alternatively, network device 210 may provide a notification to the user of media client device 205 and/or network device 210 that Wi-Fi pairing failed based on network device 210 already pairing with a maximum quantity of media client devices 205. In some implementations, network device 210 may provide a notification to the user to use a coaxial cable for connecting with content provider network 245.

Additionally, or alternatively, media client device 205 may send a setup request to content provider network 245 and/or content server device 235 to set up media client device 205 for use, via network device 210. Additionally, or alternatively, media client device 205 and content server device 235 and/or content server device 235 may communicate via network device 210 and network 215 to set up and/or activate media client device 205. For example, content server device 235 may set up media client device 205 by linking media client device 205 to a customer account. In some implementations, media client device 205 may automatically send a setup request to content server device 235 based on media client device 205 connecting to the wireless network provided by network device 210.

In some implementations, media client device 205 may receive un-provisioning information (e.g., in a case of a compromise) from HNM server device 225, via network device 210, changing or revoking the PIN stored in media client device 205, using a secure protocol (e.g., TR-069).

Although FIGS. 6A-6B shows example blocks of process 600, in some implementations, process 600 may include additional blocks, fewer blocks, different blocks, or differently arranged blocks than those depicted in FIGS. 6A-6B. Additionally, or alternatively, two or more of the blocks of process 600 may be performed in parallel.

FIGS. 7A-7E are diagrams of an example implementation 700 relating to example process 600 shown in FIGS. 6A-6B. FIGS. 7A-7E show an example of setting up a media client device utilizing zero-touch installation.

Figure 7A:
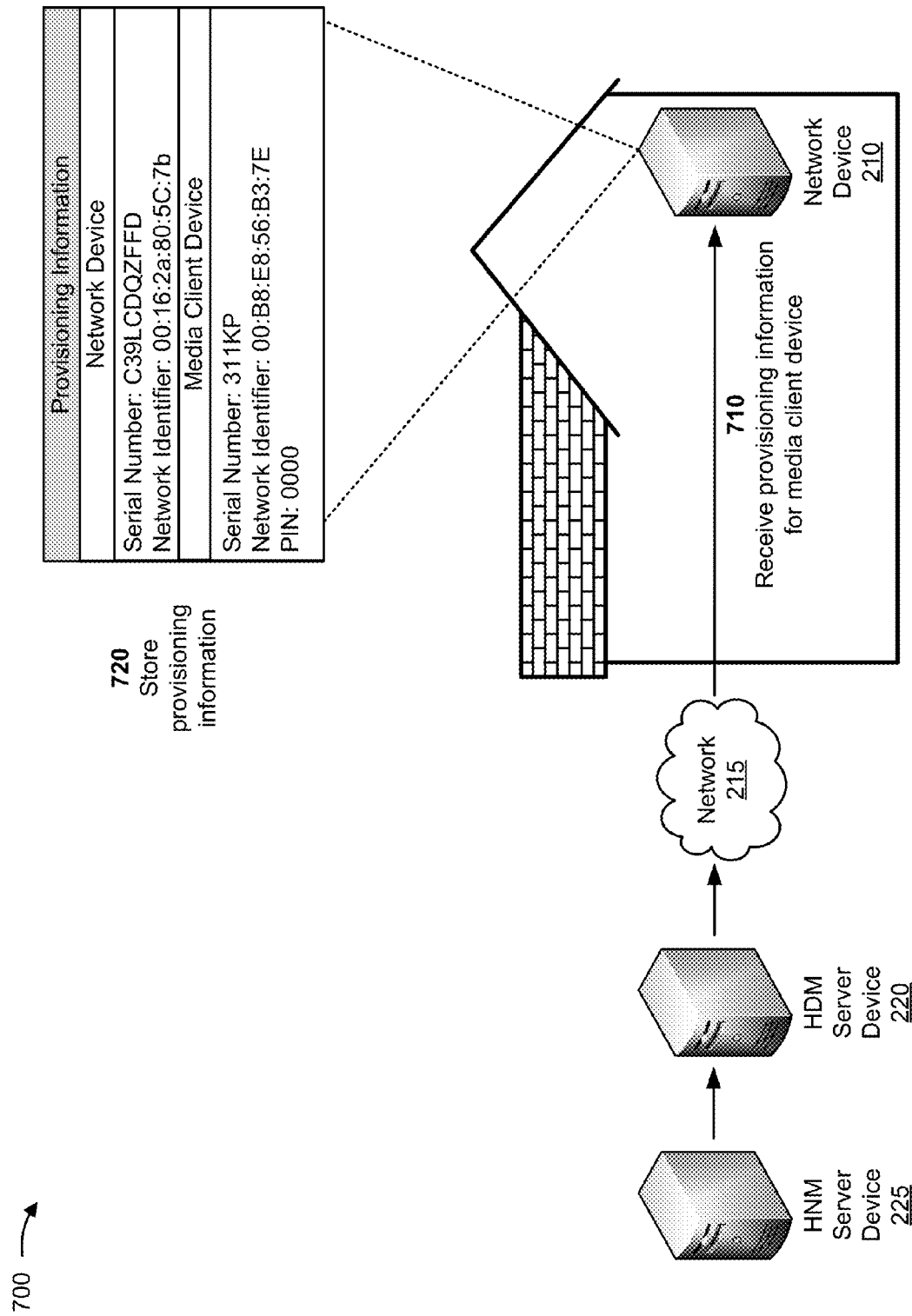
FIGS. 7A-7E are diagrams of an example implementation relating to the example process shown in FIG. 6A-6B.

As shown in FIG. 7A, assume a user (e.g., a customer of a content provider) has placed an order for a media client device (e.g., media client device 205) for self-installation with a content provider, and is waiting for delivery of media client device 205 at a location (e.g., a house). Further assume the user has a network device (e.g., network device 210), previously provided by the content provider that provides a wireless network (e.g., a Wi-Fi network) and connection to a network associated with the content provider (e.g. content provider network 245).

As shown in FIG. 7A, and by reference number 710, network device 210 receives provisioning information for media client device 205 (e.g., a serial number=311KP, a media network identifier=00:B8:E8:56:B3:7E and a PIN=0000) based on a secure session (e.g., utilizing TR-069 protocol) between an HNM server device (e.g., HNM server device 225) and network device 210, via an HDM server device (e.g., HDM server device 220) and a network (e.g. network 215). As shown in FIG. 7A, and by reference number 720, network device 210 stores the provisioning information.

Figure 7B:
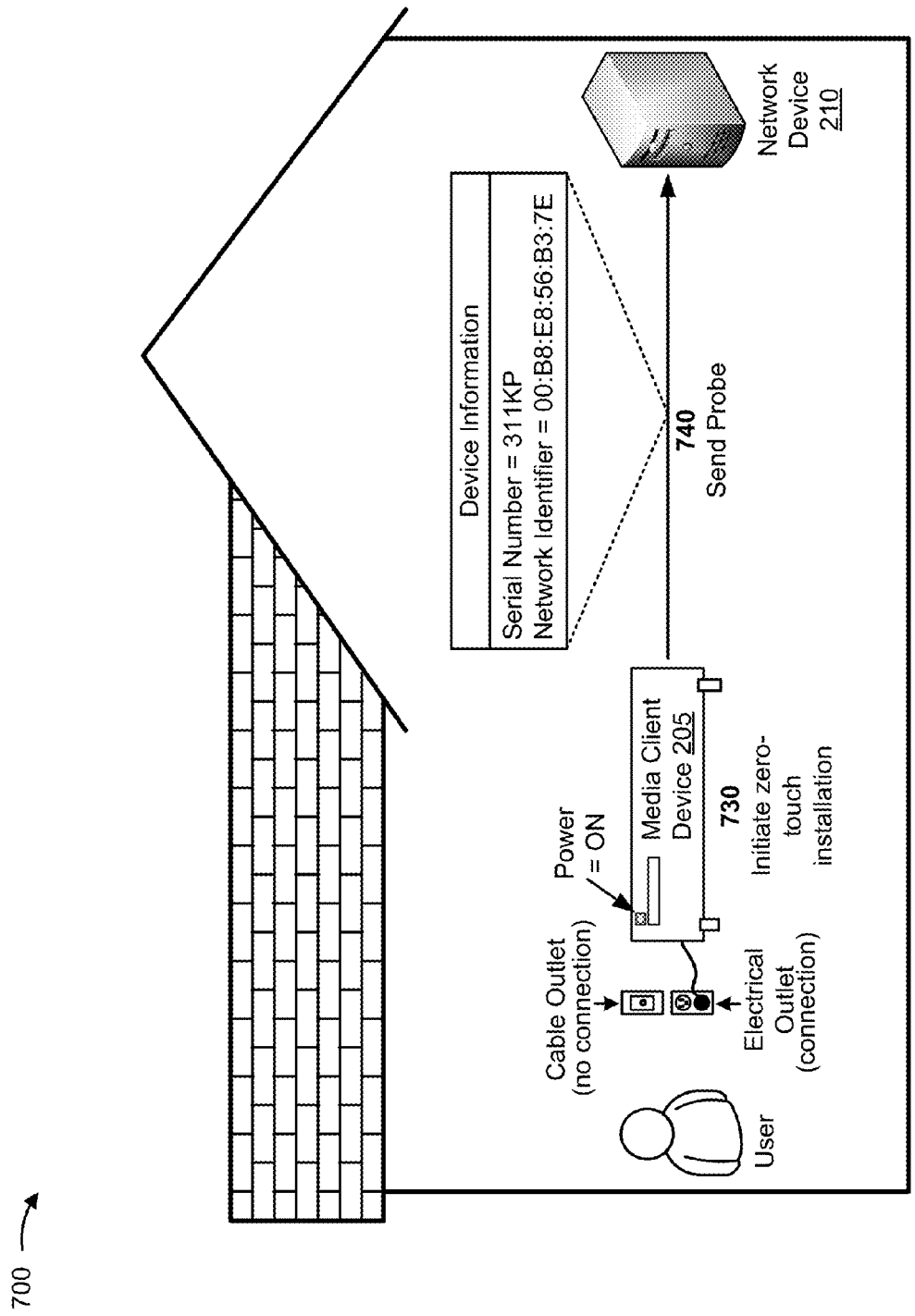

As shown in FIG. 7B, media client device 205 receives power (e.g., by the user plugging in media client device 205 into an electrical outlet and turning media client device 205 'ON'). As shown in FIG. 7B, and by reference number 730, media client device 205 detects an absence of a physical network connection for receiving media content (e.g., no signal from input for coaxial cable connection) and initiates a zero-touch installation. As shown in FIG. 7B, and by reference number 740, media client device 205 sends a probe to network device 210, including device information for media client device 205 (e.g., the device identifier=311KP and the network identifier=00:B8:E8:56:B3:7E).

Figure 7C:
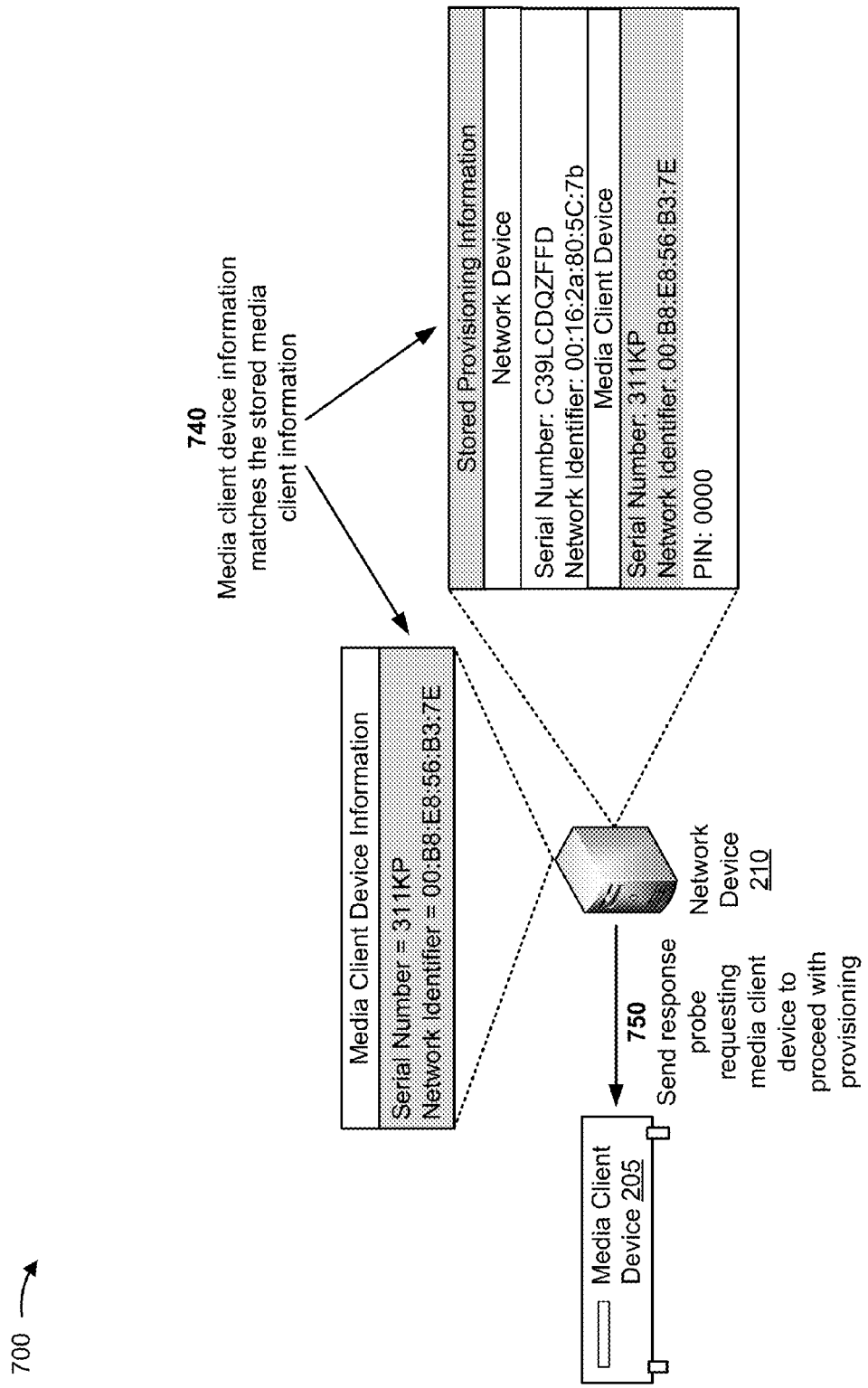

As shown in FIG. 7C, network device 210 may compare the device information provided by media client device 205 with the stored device information, included in the provisioning information received from HNM server device 225, via HDM server device 220. Network device 210 may determine that the device information provided by media client device 205 matches the stored device information, included in the provisioning information. As shown in FIG. 7C, and by reference number 750, network device 210 may send a response probe and media client device 205 may receive the response probe from network device 210 to proceed with provisioning.

Figure 7D:
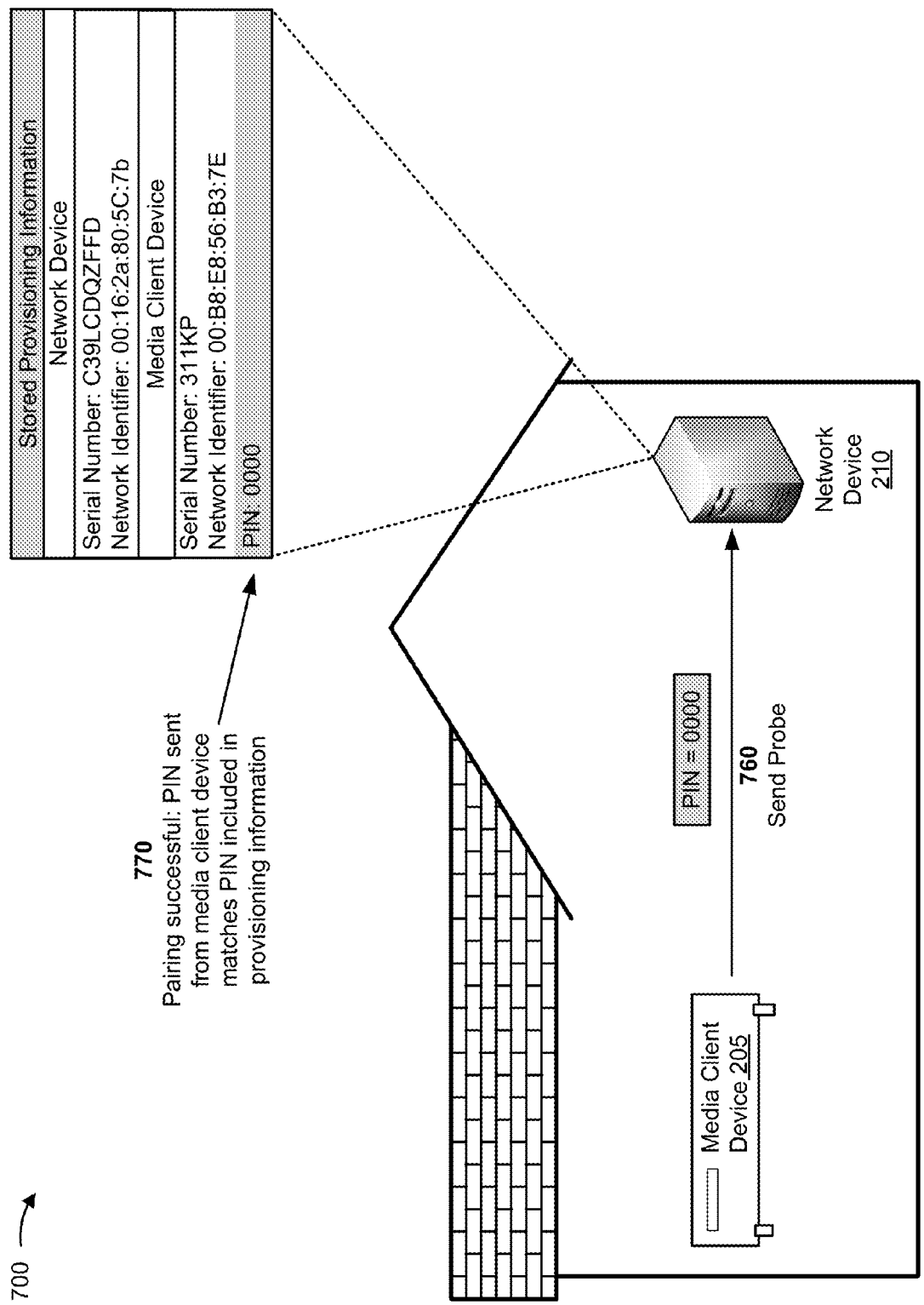

As shown in FIG. 7D, and by reference number 760, media client device 205 may proceed with provisioning by sending a PIN stored by media client device 205 (e.g., a PIN=0000 stored in a flash memory device during a burn process during manufacturing of media client device 205) to network device 210 for pairing (e.g., a Wi-Fi pairing). As shown in FIG. 7D, and by reference number 770, network device 210 compares the PIN provided by media client device 205 with the PIN, included in the stored provisioning information, and determines that the PIN provided by media client device 205 matches the PIN, included in the stored provisioning information.

Figure 7E:
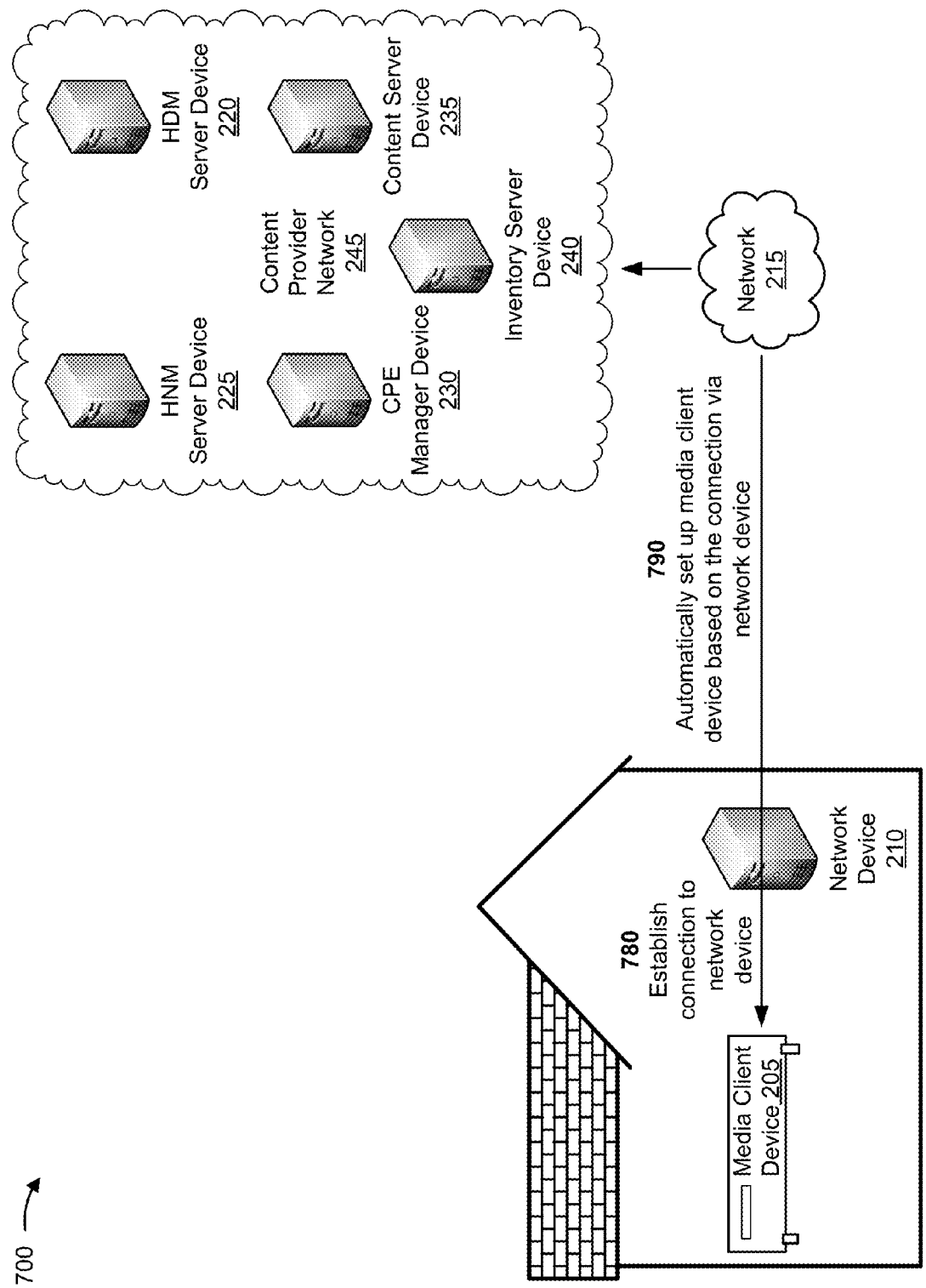

As shown in FIG. 7E, and by reference number 780, network device 210 authenticates media client device 205 based on the pairing, granting media client device 205 access to the wireless network provided by network device 210 and permits media client device 205 to communicate with network 215 via network device 210. As shown in FIG. 7E, and by reference number 790, media client device 205 automatically sets up media client device 205 based on the connection to network device 210, by sending a setup request to content provider network 245 and/or content server device 235 to set up media client device 205 for use and/or to receive media content.

As indicated above, FIGS. 7A-7E are provided merely as an example. Other examples are possible and may differ from what was described with regard to FIGS. 7A-7E.

Implementations described herein may allow for a simple and rapid installation of a media client device via an automatic installation process (e.g., a "zero-touch" installation) without having to manually input network information (e.g., a network identifier, a network passcode, etc.) for a network device into the media client device. The network device may automatically receive provisioning information (e.g., device information, including a device identifier, and a network identifier for the media client device, and a PIN for Wi-Fi pairing) for the media client device when a customer places an order for the media client device for self-installation. The network device may store the provisioning information.

The media client device may automatically initiate the zero-touch installation by detecting an absence of a physical network connection to receive media content from a content provider network. Media client device may automatically establish a secure and wireless connection to the content provider network, via the network device and based on establishing a secure connection with the network device based on previously stored provisioning information to complete the zero-touch installation.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory storing instructions; and
   one or more processors to execute the instructions to:
      receive first device information, associated with a media client device, and a first security key from a content provider network;
      store the first device information and the first security key;
      receive a provisioning request from the media client device for establishing a secure connection to receive media content from the content provider network via a network associated with the device,
         the provisioning request being received from the media client device based on the media client device detecting an absence of a physical network connection to receive the media content provided by the content provider network,
         the provisioning request including second device information;
      compare the first device information and the second device information;
      send a response to the media client device requesting a second security key based on the first device information matching the second device information;
      receive the second security key from the media client device;
      compare the first security key and the second security key;
      determine a quantity of secure connections between the device and one or more media client devices; and
      enable the media client device to establish the secure connection to the content provider network, via the network associated with the device, based on the first security key matching the second security key and based on the quantity of secure connections not exceeding a maximum quantity of secure connections permitted by the device.

2. The device of claim 1, where at least one of the first device information or the second device information includes a device identifier, associated with the media client device, and a network identifier.

3. The device of claim 1, where at least one of the first security key or the second security key is a personal identification number for wireless fidelity pairing.

4. The device of claim 1, where the second security key is stored in a memory device included in or accessible by the media client device.

5. The device of claim 1, where the first device information and the first security key are received automatically from the content provider network based on a shipment of the media client device to a customer for self-installation.

6. The device of claim 1, where the provisioning request from the media client device is made without any input from a user of the media client device.

7. The device of claim 1, where at least one of the first device information or the second device information includes at least one of:
   a Media Access Control (MAC) address associated with the media client device,
   a network identifier, or
   a serial number associated with the media client device.

8. A non-transitory computer-readable medium storing instructions, the instructions comprising:
   one or more instructions that, when executed by one or more processors of a device, cause the one or more processors to:
      receive first device information, associated with a media client device, and a first security key from a content provider network;
      store the first device information and the first security key;
      receive a provisioning request from the media client device for establishing a secure connection to receive media content from the content provider network via a network associated with the device,
         the provisioning request being received from the media client device based on the media client device detecting an absence of a physical network connection to receive the media content provided by the content provider network,
         the provisioning request including second device information;
      compare the first device information and the second device information;
      send a response to the media client device requesting a second security key based on the first device information matching the second device information;

receive the second security key from the media client device;

compare the first security key and the second security key;

determine a quantity of secure connections between the device and one or more media client devices;

enable the media client device to establish the secure connection to the content provider network via the network associated with the device based on the first security key matching the second security key and based on the quantity of secure connections not exceeding a maximum quantity of secure connections permitted by the device; and provide the media content to the media client device from the content provider network.

9. The non-transitory computer-readable medium of claim 8, where the first device information and the first security key are received utilizing a Technical Report 069 protocol.

10. The non-transitory computer-readable medium of claim 8, where the secure connection is established through a wireless fidelity pairing process.

11. The non-transitory computer-readable medium of claim 10, where the one or more instructions, when executed by the one or more processors, further cause the one or more processors to:

provide an error message to the media client device when the secure connection cannot be established based on failure of the wireless fidelity pairing process when the first security key does not match the second security key.

12. The non-transitory computer-readable medium of claim 8, where the one or more instructions, when executed by the one or more processors, further cause the one or more processors to:

enable the media client device to establish the secure connection to the content provider network via the network associated with the device based on a hard wireless fidelity pairing process when the first security key does not match the second security key.

13. The non-transitory computer-readable medium of claim 8, where the one or more instructions, when executed by the one or more processors, further cause the one or more processors to:

enable the media client device to establish the secure connection to the content provider network via the network associated with the device based on a soft wireless fidelity pairing process when the first security key does not match the second security key.

14. A method, comprising:

receiving, by a device, first device information, associated with a media client device, and a first security key from a content provider network;

storing, by the device, the first device information and the first security key;

receiving, by the device, a provisioning request from the media client device for establishing a secure connection to receive media content from the content provider network via a network associated with the device, the provisioning request being received from the media client device based on the media client device detecting an absence of a physical network connection to receive the media content provided by the content provider network, the provisioning request including second device information;

comparing, by the device, the first device information and the second device information;

sending, by the device, a response to the media client device requesting a second security key based on the first device information matching the second device information;

receiving, by the device, the second security key from the media client device;

comparing, by the device, the first security key and the second security key;

determining, by the device, a quantity of secure connections between the device and one or more media client devices;

enabling, by the device, the media client device to establish the secure connection to the content provider network via the network associated with the device based on the first security key matching the second security key and based on the quantity of secure connections not exceeding a maximum quantity of secure connections permitted by the device; and providing the media content to the media client device from the content provider network.

15. The method of claim 14, where the media client device is associated with the device based on the media client device and the device being associated with a same customer.

16. The method of claim 15, where the first device information and the first security key are received by the device when the media client device, ordered by the same customer, is shipped to the same customer.

17. The method of claim 15, where the device is identified based on network device information included in a customer account associated with the same customer.

18. The method of claim 14, further comprising:

providing an error message to the media client device when the media client device fails to send the provisioning request after detecting a presence of a physical network connection for receiving the media content provided by the content provider network.

19. The method of claim 14, further comprising:

revoking the first security key based on receiving un-provisioning information.

20. The method of claim 14, further comprising:

ignoring the provisioning request when the first device information does not match the second device information received in the provisioning request; and continuing passive listening for a provisioning request from a media client device with device information matching the stored first device information.

* * * * *